United States Patent
Haga

(10) Patent No.: US 9,599,978 B2
(45) Date of Patent: *Mar. 21, 2017

(54) NUMERICAL CONTROL APPARATUS HAVING FUNCTION OF REDUCING PATH TO START POINT IN CANNED CYCLE

(71) Applicant: FANUC Corporation, Minamitsuru-gun, Yamanashi (JP)

(72) Inventor: Makoto Haga, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 345 days.

This patent is subject to a terminal disclaimer.

(21) Appl. No.: 14/320,842

(22) Filed: Jul. 1, 2014

(65) Prior Publication Data
US 2015/0012125 A1    Jan. 8, 2015

(30) Foreign Application Priority Data
Jul. 2, 2013    (JP) .................................. 2013-139019

(51) Int. Cl.
*G06F 19/00*    (2011.01)
*B23C 3/00*    (2006.01)
*G05B 19/18*    (2006.01)
*G05B 19/4069*    (2006.01)

(52) U.S. Cl.
CPC ....... *G05B 19/182* (2013.01); *G05B 19/4069* (2013.01); *G05B 2219/45038* (2013.01)

(58) Field of Classification Search
None
See application file for complete search history.

(56) References Cited

U.S. PATENT DOCUMENTS

| | | | | |
|---|---|---|---|---|
| 4,489,377 A | * | 12/1984 | Mawyer | G05B 19/4061 318/565 |
| 2001/0052757 A1 | * | 12/2001 | Sugiyama | G05B 19/182 318/569 |
| 2003/0170085 A1 | * | 9/2003 | Kakino | G05B 19/40937 409/132 |
| 2009/0036280 A1 | | 2/2009 | Yazaki | |

(Continued)

FOREIGN PATENT DOCUMENTS

CN    101096072 A    1/2008
CN    101372084 A    2/2009

(Continued)

OTHER PUBLICATIONS

Notification of Reasons for Refusal (along with its English-language translation) dated Jun. 16, 2015 in corresponding Japanese Patent Application No. 2013-139019.

(Continued)

*Primary Examiner* — Mohammad Ali
*Assistant Examiner* — Md Azad
(74) *Attorney, Agent, or Firm* — Drinker Biddle & Reath

(57) ABSTRACT

In a canned cycle, a straight path is set from a cutting completion position in a cycle to a cutting start position in a next cycle. Furthermore, when there is a possibility that the set straight path interferes with a workpiece, a region for which the workpiece has been already cut is determined, and a path not interfering with the workpiece is set with as short length as possible.

2 Claims, 20 Drawing Sheets

EXAMPLE OF PATH FOR WHICH SECOND PIECE OF INTERFERENCE CHECK MEANS DETERMINES NO INTERFERENCE

(56) References Cited

U.S. PATENT DOCUMENTS

2011/0166693 A1* 7/2011 Nishibashi ......... G05B 19/4103
700/187
2012/0239182 A1* 9/2012 Kikata ............... G05B 19/4061
700/186

FOREIGN PATENT DOCUMENTS

| CN | 103116315 A | 5/2013 |
|---|---|---|
| JP | H07-121221 A | 5/1995 |
| JP | H09-330109 A | 12/1997 |
| JP | 10-296547 A | 11/1998 |
| JP | H10-293606 A | 11/1998 |
| JP | 2002-6913 A | 1/2002 |
| JP | 2003-117716 A | 4/2003 |
| JP | 2007-307680 A | 11/2007 |
| JP | 2008-009758 A | 1/2008 |

OTHER PUBLICATIONS

Notice of Grounds for Rejection (along with its English-language translation) dated Nov. 25, 2014 in corresponding Japanese Patent Application No. 2013-139019.

* cited by examiner

EXAMPLE OF MOVEMENT PATH IN CANNED CYCLE ACCORDING TO EMBODIMENT 1

EXAMPLE OF PATH FOR WHICH FIRST PIECE OF INTERFERENCE CHECK MEANS DETERMINES INTERFERENCE

EXAMPLE OF THIRD PIECE OF INTERFERENCE CHECK MEANS AND FOURTH PIECE OF INTERFERENCE CHECK MEANS

NUMERICAL CONTROL APPARATUS HAVING FUNCTION OF REDUCING PATH TO START POINT IN CANNED CYCLE

RELATED APPLICATION DATA

This application claims priority under 35 U.S.C. §119 and/or §365 to Japanese Application No. 2013-139019 filed Jul. 2, 2013, the entire contents is incorporated herein by reference.

BACKGROUND OF THE INVENTION

1. Field of the Invention

The present invention relates to a numerical control apparatus that controls a machine tool, and specifically, relates to a numerical control apparatus to reduce a path length to a start point in a canned cycle.

2. Description of the Related Art

A numerical control apparatus performs, upon one instruction, machining a workpiece from a material shape of the workpiece to a finishing shape thereof in accordance with a canned cycle constituted of a plurality of cutting cycles for each cutting cycle of which a movement path from a start position of the movement path to an end position thereof is formed of a plurality of paths as one cutting cycle which conventionally causes a return once from a cutting completion position in the cycle to a start position of the cycle or a movement along only a first planar axis to start the next cycle. Herein, the first planar axis designates an X-axis in the case of an XY-plane, designates a Z-axis in the case of a ZX-plane and designates a Y-axis in the case of a YZ-plane. Moreover, a second planar axis designates the Y-axis in the case of the XY-plane, designates the X-axis in the case of the ZX-plane and designates the Z-axis in the case of the YZ-plane.

As to the conventional canned cycle, a region for which a workpiece has been already cut is not determined but the above-mentioned operation is always performed for preventing interference with the workpiece. As a solution against this problem, section "Solution" in Japanese Patent Laid-Open No. 10-293606 discloses the followings as a method for configuring the path. A cutting state determination unit is provided to detect spindle load exerted on a tool in executing a specific cutting block of a machining program to determine an actual cutting state of the workpiece with the tool. A tool position detection unit is provided to detect the position of the tool when it is determined that the cutting state is changed. A program rewriting unit is provided to rewrite, as a target section of a rapid traverse instruction G0, a section in which the tool does not actually cut the workpiece in the specific cutting block, of the machining program, instructed with a rewriting instruction mark on the basis of a determination signal of the cutting state from the cutting state determination unit and a tool position in the occasion of the change in cutting state detected by the tool position detection unit.

Moreover, as another solution, section. "Solution" in Japanese Patent Laid-Open No. 2008-9758 discloses a method of performing predetermined machining by moving the tool relatively to the workpiece on the basis of a stored machining program, a program storage unit storing the machining program in which a cutting feed instruction for instruction of a cutting feed from a cutting feed start position and a rapid traverse instruction for instruction of rapid traverse to the cutting feed start position are described. According to the method, a contact detection unit is provided to monitor the presence or absence of contact of the tool with the workpiece. On the basis of a detection signal from the contact detection unit, the cutting feed start position of the machining program is changed to change and set the movement path of the tool to the cutting feed start position in the rapid traverse instruction.

However, the cutting control apparatus disclosed in Japanese Patent Laid-Open No. 10-293606 above does not reduce the path but changes the section which is not actually in the cutting state for the cutting block to the rapid traverse one to reduce cycle time. Hence, cycle time cannot be reduced when rapid traverse blocks are originally set, this being a problem.

Moreover, the machine tool disclosed in Japanese Patent Laid-Open No. 2008-9758 above changes the movement path for a path corresponding to a rapid traverse instruction regarding one block. Hence, paths of rapid traverse instructions regarding a plurality of blocks cannot be reduced, the reduced path is a cutting block, and the contact detection unit as hardware is necessary, these being problems.

SUMMARY OF THE INVENTION

Therefore, an object of the present invention is to provide a numerical control apparatus having a function of reducing a path to a start point in a canned cycle, the apparatus configuring a straight path from a cutting completion position in a cycle to a cutting start position in a next cycle in the canned cycle.

In an embodiment according to the present invention, a straight path from a cutting completion position in a cycle to a cutting start position in a next cycle in a canned cycle is set. Furthermore, when there is a possibility that the set straight path interferes with a workpiece, a region for which the workpiece has been already cut is determined and a path which does not interfere with the workpiece and is reduced as short as possible is set. In a conventional canned cycle, a return once from the cutting completion position in the cycle to the start position of the cycle or a movement along only the first planar axis is made, followed by the next cycle to be started. In the embodiment according to the present invention, the region for which the workpiece has been already cut is determined and the path from the cutting completion position in the cycle to the cutting start position in the next cycle is reduced as short as possible, this reducing cycle time.

A numerical control apparatus according to the present invention performs, upon one instruction, machining on a workpiece from a material shape thereof to a finishing shape thereof in accordance with a canned cycle constituted of a plurality of cutting cycles for each cutting cycle of which a movement path from a start position thereof to an end position thereof is formed of a plurality of paths as one cutting cycle, the apparatus comprising interference check means that determines whether or not interference between the workpiece and the movement path arises when the movement path from a cutting completion position in the one cycle to a cutting start position in a next cycle is straight, wherein the interference check means causes, when the interference is determined not to arise, the movement path from the cutting completion position in the one cycle to the cutting start position in the next cycle to be straight. Thereby, a straight path from the cutting completion position in the cycle to the cutting start position in the next cycle can be set in the canned cycle.

When the interference check means determines that the movement path interferes with the workpiece, a straight movement along two blocks of straight lines from the cutting completion position in the one cycle to the cutting start position in the next cycle may be made within a range in which no interference with the workpiece is determined, the two straight lines forming an angle of 90 degrees or more and less than 180 degrees. Otherwise, when the interference check means determines that the movement path interferes with the workpiece, a movement in a shape of an arc may be made, the arc passing through three positions of a position which falls within a range in which no interference with the workpiece is determined, the cutting completion position in the one cycle and the cutting start position in the next cycle. Thereby, a region for which the workpiece has been already cut can be determined and a path not interfering with the workpiece is set with as short length as possible.

According to the present invention, the configuration above allows a straight movement from the cutting completion position in the cycle to the cutting start position in the next cycle in the canned cycle, and thereby, enables the path to be reduced. Furthermore, when there is a possibility that the movement path interferes with the workpiece, a region for which the workpiece has been already cut is determined to prevent interference, and the path from the cutting completion position in the cycle to the cutting start position in the next cycle is set with as short length as possible.

BRIEF DESCRIPTION OF THE DRAWINGS

Other aspects and advantages, as well as the above-mentioned ones, of the present invention will be apparent more from the following detailed description of the embodiments with reference to the accompanying drawings which are.

DETAILED DESCRIPTION OF THE PREFERRED EMBODIMENTS

In the present specification hereafter, a first planar axis designates an X-axis in the case of an XY-plane, designates a Z-axis in the case of a ZX-plane and designates a Y-axis in the case of a YZ-plane. Moreover, a second planar axis designates the Y-axis in the case of the XY-plane, designates the X-axis in the case of the ZX-plane and designates the Z-axis in the case of the YZ-plane.

Figure 1:
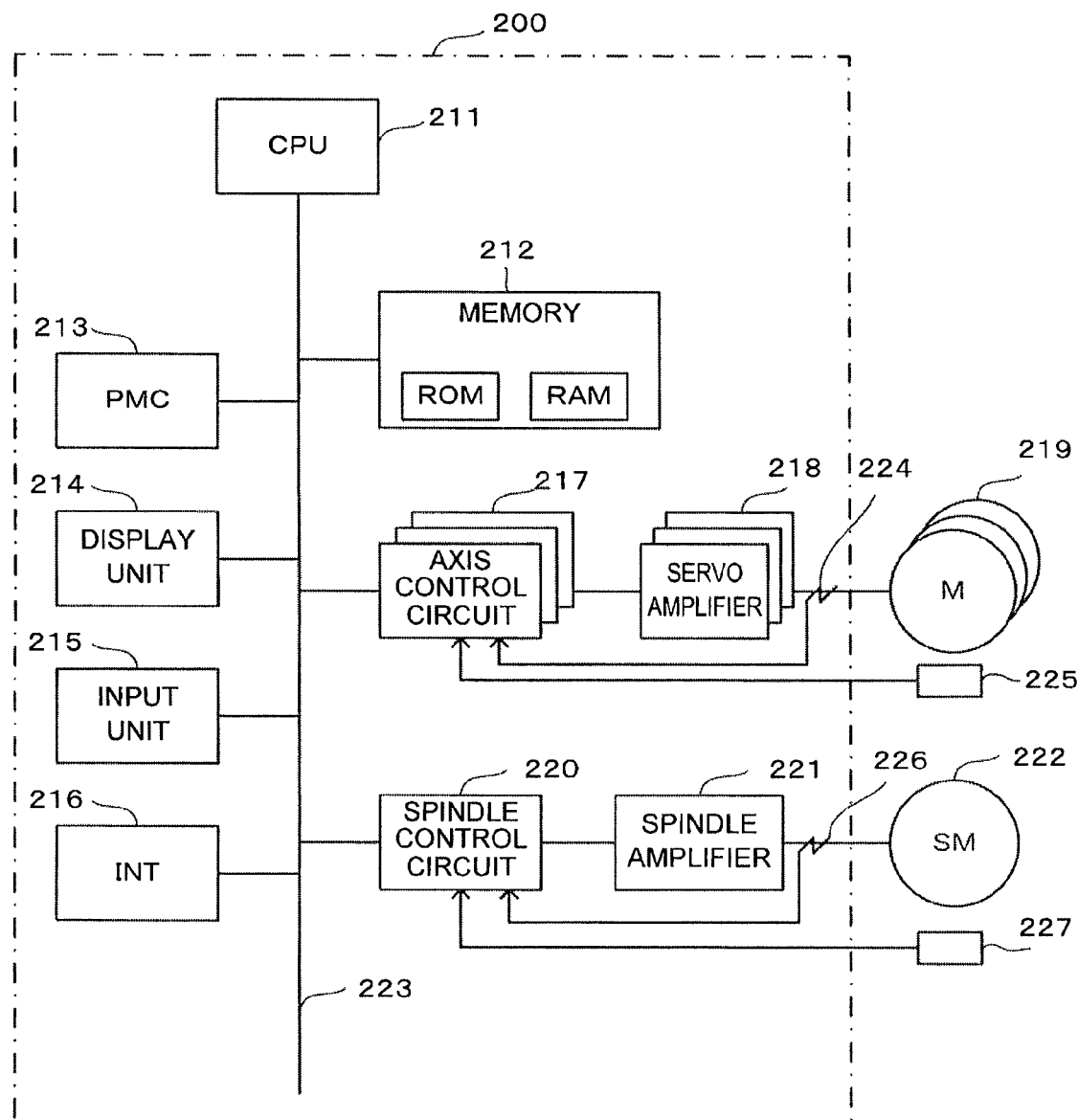
FIG. 1 is a block diagram of the essential portion of a numerical control apparatus having a function of reducing a path to a start point in a canned cycle according to the present invention.

FIG. 1 is a block diagram of the essential portion of a numerical control apparatus having a function of reducing a path to a start point in a canned cycle according to the present invention. A CPU 211 is a processor that controls the entire numerical control apparatus 200. The CPU 211 is connected, via a bus 223, to a memory 212 constituted of a ROM, a RAM, a non-volatile memory and the like, a PMC (programmable machine controller) 213, a display unit 214 constituted of a liquid crystal display unit, an input unit 215 such as a keyboard for inputting various instructions and data, an interface (INT) 216 connected to an external storage medium, a host computer and the like, axis control circuits 217 for a machine tool, and a spindle control circuit 220. Notably, regarding the axis control circuits 217 for the machine tool, FIG. 1 exemplarily illustrates those for three axes. The CPU 211 reads out a system program stored in the memory 212 via the bus 223 and controls the entire numerical control apparatus in accordance with the system program. Moreover, the memory 212 stores a program for realizing the function of reducing a path to a start point in a canned cycle.

The PMC 213 outputs a signal to an auxiliary apparatus, of a machining machine, which is a control object on the basis of a sequence program built in the numerical control apparatus 200, or performs control upon input from a signal from the auxiliary apparatus. Moreover, the PMC 21.3 receives signals of various switches on an operation panel installed in the main body of the machining machine controlled by the numerical control apparatus to perform necessary processing on the signals, and after that, transmits the signals to the CPU 211.

The axis control circuits 217 for three axes in total, for the X-axis, the Y-axis and the Z-axis, receive movement instruction amounts which undergo interpolation processing and are distributed from the CPU 211 to the axes, and output instructions for the axes to servo amplifiers 218, respectively. The servo amplifiers 218 receive the instructions and drive servo motors 219 for the axes of the machine tool, respectively.

Each of the servo motors 219 for the axes includes a position/speed detector 225. A position/speed feedback signal from the position/speed detector 225 is fed back to the axis control circuit 217 to perform feedback control of the speed and position.

Moreover, a drive current outputted from the servo amplifier 218 to the servo motor 219 is detected by a current detector 224 and fed back to the axis control circuit 217 to be used for current control or torque control. The spindle control circuit 220 receives a spindle rotation instruction and outputs a spindle speed signal to a spindle amplifier 221. The spindle amplifier 221 receives the spindle speed signal and the spindle motor 222 rotates at the instructed rotation speed. Meanwhile, a position coder 227 detects the rotation speed of the spindle, feeds it back to the spindle control circuit 220 to perform speed control. Furthermore, the spindle control circuit 220 receives a current feedback signal from a current detector 226 that detects a drive current flowing through a spindle motor 222 to perform current loop control for controlling the rotation speed of the spindle motor 222.

This control is mainly applied to a lathe machine in which a workpiece rotates. The spindle contains the spindle motor 222 inside and the workpiece is mounted on the spindle. In the state where the spindle is fixed as a whole, rotation of the spindle motor 222 causes the workpiece mounted on the spindle to rotate. A tool is mounted on a tool rest and driven by the servo motors 219 for the X-axis, the Y-axis and the Z-axis which are movable axes to operate. The tool mounted on the tool rest is pressed on the workpiece with operation via the X-axis, the Y-axis and the Z-axis which are the movable axes to be moved relatively to the workpiece, which undergoes machining.

The numerical control apparatus 200 has a function of interpreting and executing the machining program constituted of machining cycle instructions. The processor, that is, CPU 211 of the numerical control apparatus 200 analyses the machining program constituted of machining cycle instructions and stores workplace shape data for cycle machining designated by the machining program in the memory 212. It calculates and converts machining paths for cycle machining on the basis of the workpiece shape data into tool path instructions and stores the tool path instruction thus converted in the memory 212.

Figure 2:
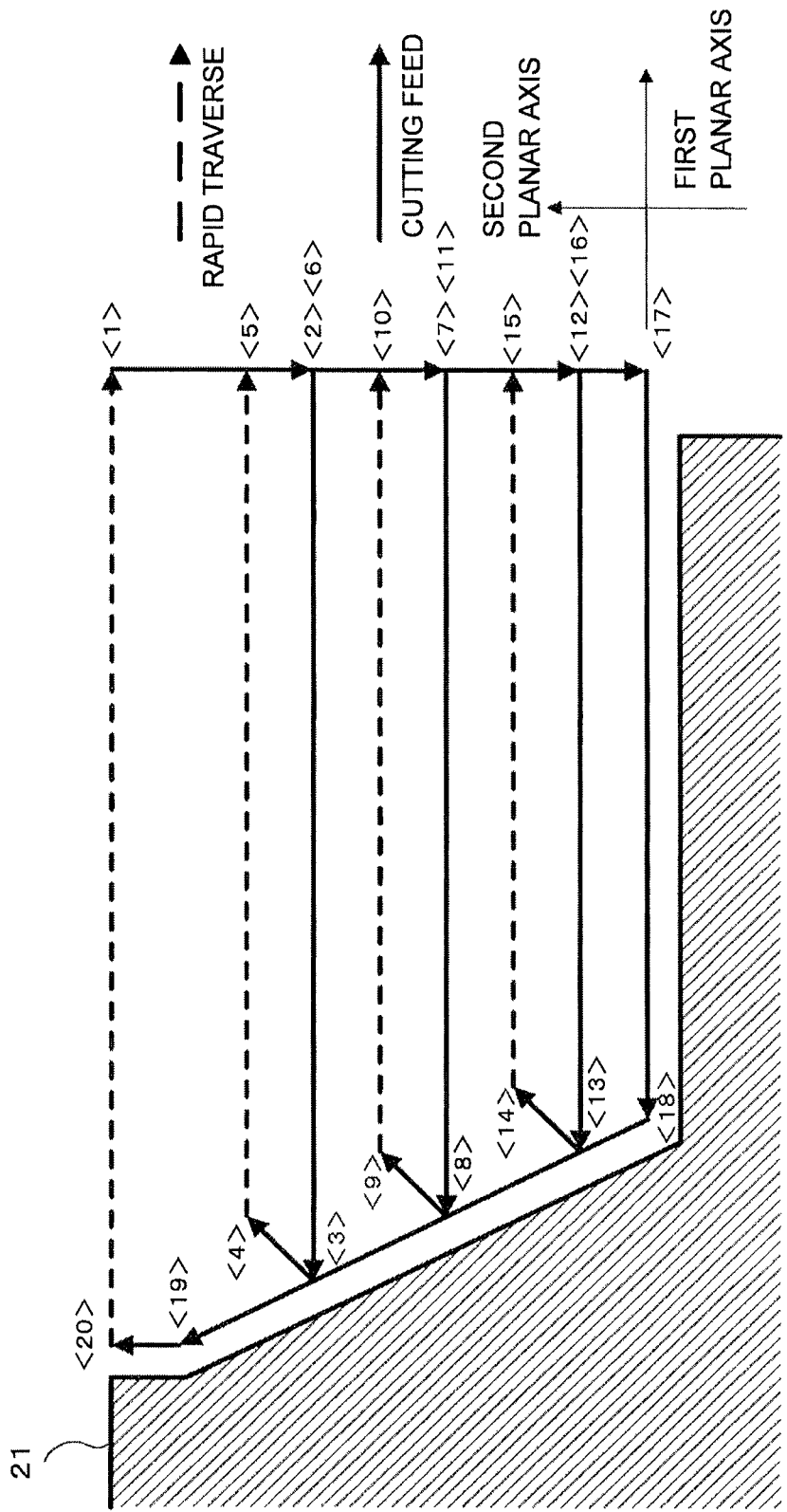
FIG. 2 is a diagram for explaining a movement path in a canned cycle in a conventional art.

FIG. 2 is a diagram for explaining movement paths in a canned cycle according to a conventional art. The canned cycle is constituted of a plurality of cycles for each cycle of which a movement path is constituted of a plurality of positions. In the case of FIG. 2, a first cycle is constituted, as one cycle, of a start position <1> of the cycle, positions <2> and <3> where a movement direction changes in the cycle, a cutting completion position <4> in the cycle and a completion position <5> of the cycle. The next cycle is constituted of a start position <5> of the cycle, a cutting start position <6> in the cycle, positions <7> and <8> where a movement-direction changes in the cycle, a cutting completion position <9> in the cycle and the completion position. <10> of the cycle.

In the conventional canned cycle, as illustrated in FIG. 2, the next cycles are respectively started from the respective positions after a return once from the cutting completion positions <4>, <9> and <14> in the respective cycles to the start position <1> of the cycle (completion position of the cycle) or a movement along only the first planar axis to the completion positions <5>, <10> and <15> of the respective cycles.

Figure 3:
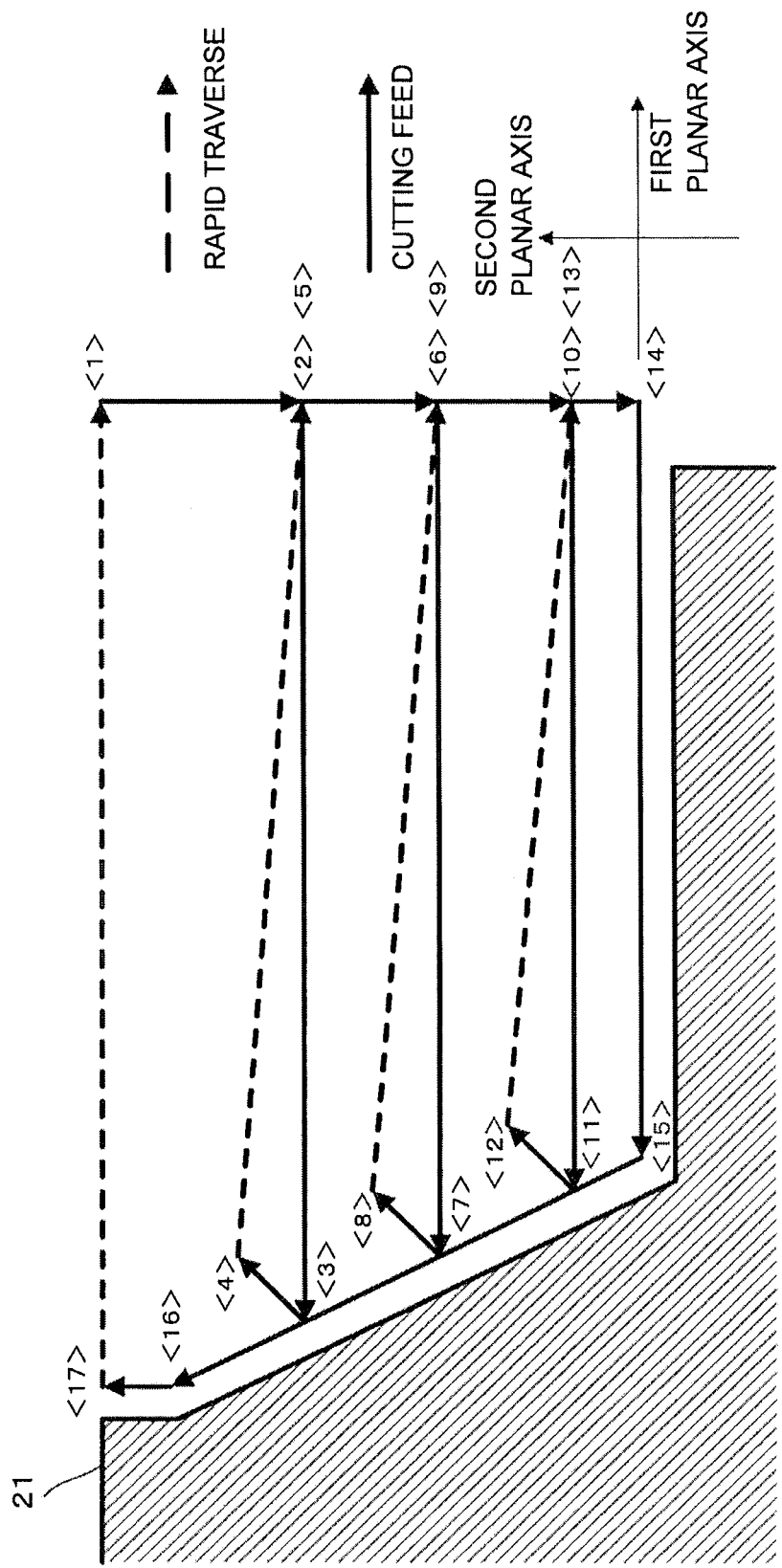
FIG. 3 is a diagram for explaining a movement path in a canned cycle according to Embodiment 1 of the present invention.

On the contrary, in Embodiment. 1, as illustrated in FIG. 3, a region for which the workpiece has been already cut is determined. Thereby, a path from the cutting completion position in the cycle to the cutting start position in the next cycle is set with as short length as possible, or reduced as short as possible, to attain reduced cycle time. In Embodiment 1, as illustrated in FIG. 3, straight; paths from the cutting completion positions <4>, <8> and <12> in the respective cycles to the cutting start positions <5>, <9> and <13> in the respective next cycles are respectively determined that they were cut based on the cutting paths in the respective cycles. Hence, straight movements from the cutting completion positions <4>, <8> and <12> in the respective cycles to the cutting start positions <5>, <9> and <13> in the respective next cycles are respectively made. Thereby, a relative movement path of the tool (not shown) can be reduced, this enabling cycle time to be reduced.

As illustrated in FIG. 3, since the tool takes the movement path to come relatively close to a workpiece 21, interference checks between the tool and the workpiece 21 are necessary. Hereafter, interference check means is described.

(First Piece of Interference Check Means)

Figure 4:
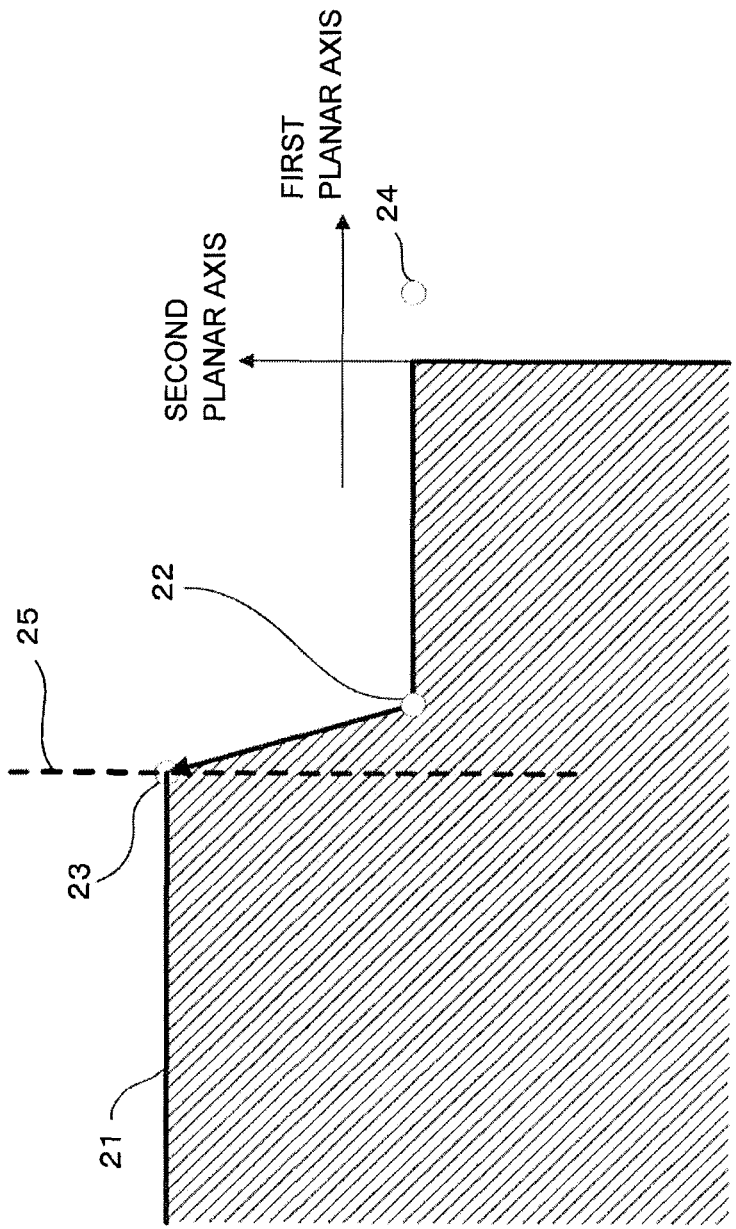
FIG. 4 is a diagram for explaining Example 1 of a first piece of interference check means.

A straight movement from the cutting completion position in the cycle to the cutting start position in the next cycle by way of example is described. In FIG. 4, when a position which is previous by one to the cutting completion position in the cycle and at which the movement direction changes is present in a half plane on the side where the cutting start position in the next cycle is present with respect to the perpendicular line which passes through the cutting completion position in the cycle relative to the first planar axis, it is determined that the movement path interferes with the workpiece.

FIG. 4 is a diagram for explaining Example 1 of the first piece of interference check means. A position 22 which is previous by one to the cutting completion position in the cycle and at which the movement direction changes is present on a perpendicular line 25 which passes through the cutting completion position. 23 in the cycle relative to the first planar axis or in the half plane on the side where a cutting start position 24 in the next cycle is present with respect to the perpendicular line 25. Hence, it is determined that the movement path interferes with the workplace 21.

In the case of ideal operation of the first planar axis and the second planar axis from the cutting completion position 23 in the cycle to the next cutting start position 24, interference does not arise. Nevertheless, in real cycle machining, there is a possibility of the second planar axis to operate earlier microscopically. Therefore, interference is here determined to arise.

Figure 5:
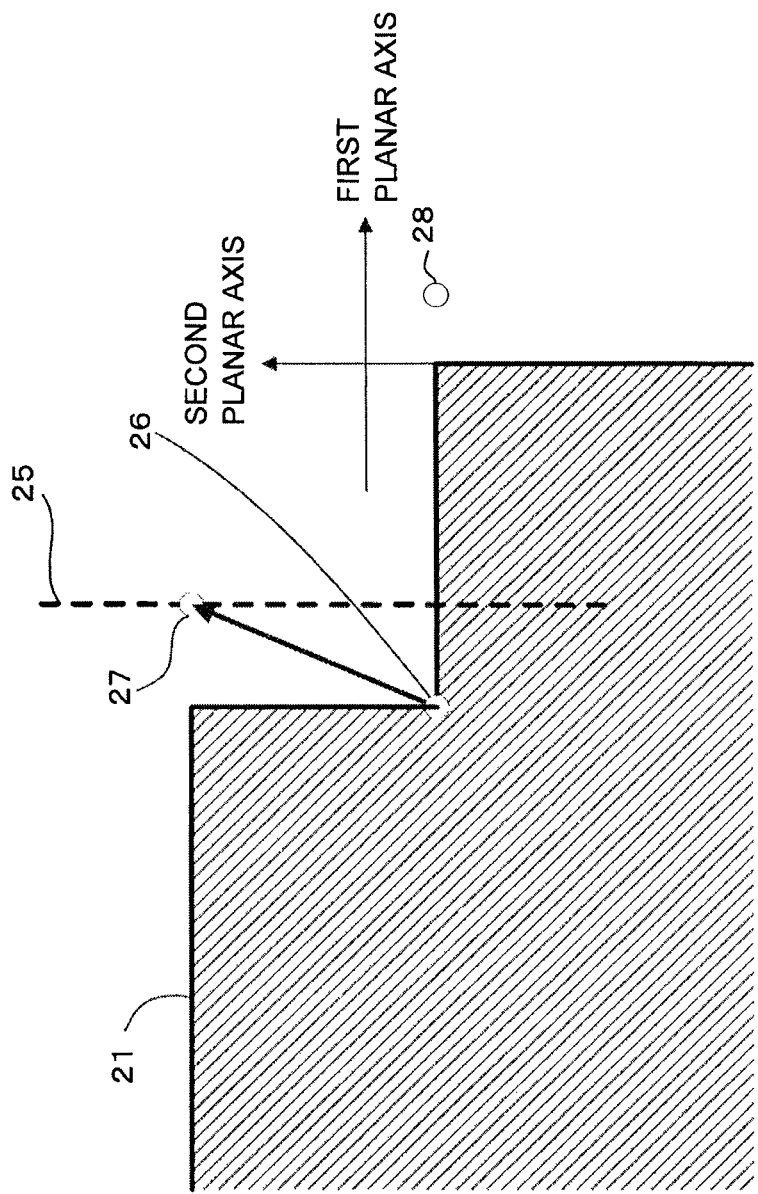
FIG. 5 is a diagram for explaining Example 2 of the first, piece of interference check means.

FIG. 5 is a diagram for explaining Example 2 of the first piece of interference check means. A position 26, which is immediately previous to a cutting completion position 27 in the cycle and at which the movement direction changes, is present on a perpendicular line 25 which passes through the cutting completion position in the cycle relative to the first planar axis or in a half plane on the side where a cutting start position 28 in the next cycle is not present with respect to the perpendicular line 25. Hence, it is determined that the movement path does not interfere with the workpiece 21.

(Second Piece of Interference Check Means)

Figure 6:
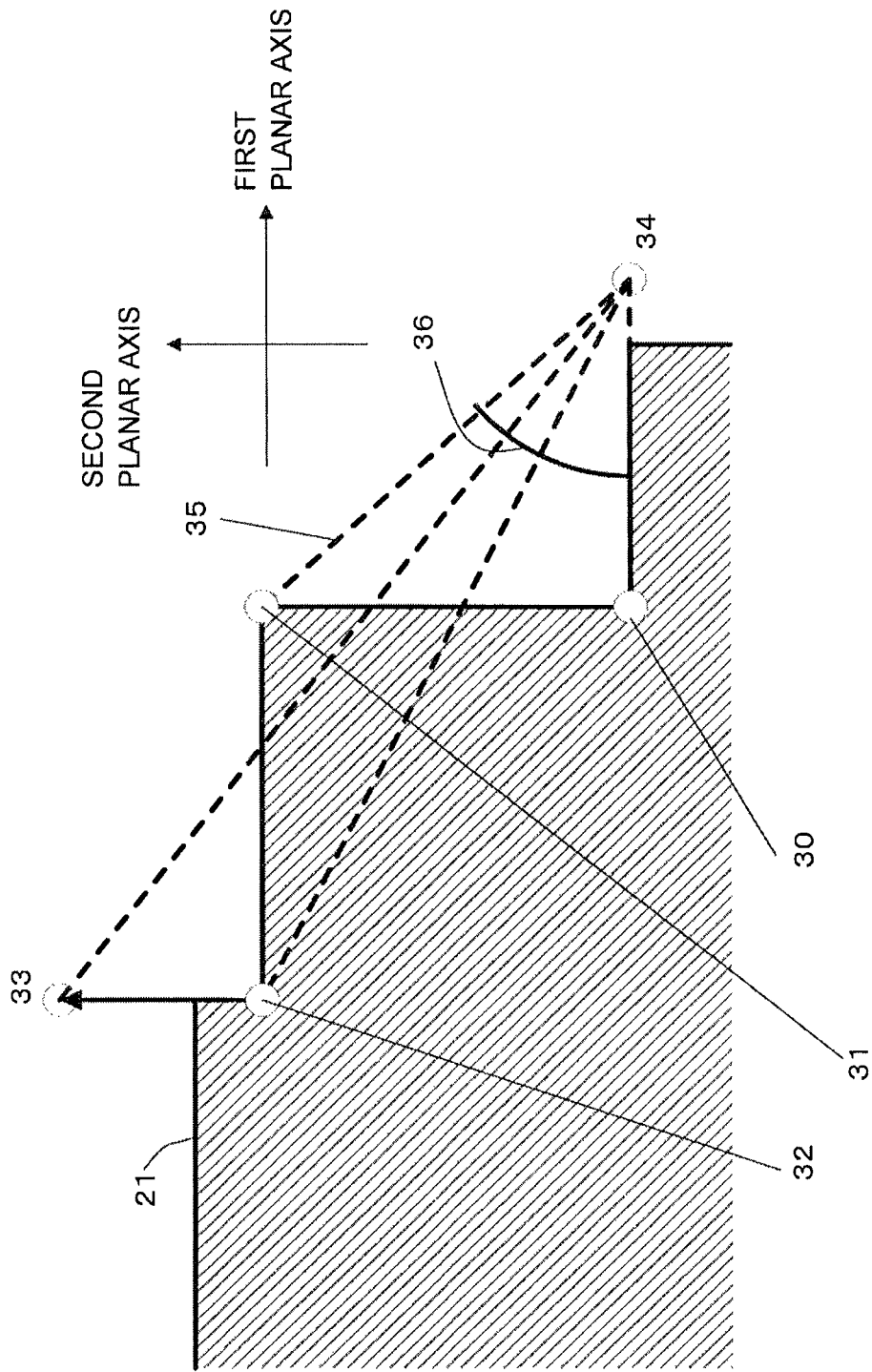
FIG. 6 is a diagram for explaining Example 1 of a second piece of interference check means.

A straight movement from the cutting completion position in the cycle to the cutting start position in the next cycle by way of example is described. As illustrated in FIG. 6, when, out of all the positions where the movement direction changes in the cycle, a position where an angle formed by the first planar axis and a straight line connecting the cutting start position in the next cycle to a position at which the movement direction changes in the cycle is larger than an angle formed by the first planar axis and a straight line connecting the cutting start position in the next cycle to the cutting completion position in the cycle is present, or as illustrated in FIG. 8, when, out of all the arcs in the cycle, an arc where an angle formed by the first planar axis and a tangential line, of the arc, passing through the cutting start position in the next cycle is larger than an angle formed by the first planar axis and a straight line connecting the cutting start position in the next cycle to the cutting completion position in the cycle is present, it is determined that the movement path interferes with the workpiece.

FIG. 6 is a diagram for explaining Example 1 of a second piece of interference check means. When, out of angles formed by the first planar axis and straight lines connecting a cutting start position 34 in the next cycle respectively to a cutting completion position 33 in the cycle and positions 30, 31 and 32 at which the movement direction changes in the cycle, an angle formed by the first planar axis and a straight line connecting the cutting start position 34 in the next cycle to any of the positions 30, 31 and 32 at which the movement direction changes in the cycle is the maximum angle, the workpiece 21 is determined to cause interference. In FIG. 6, an angle 36 formed by the first planar axis and a straight line 35 connecting the cutting start position 34 in the next cycle to the position 31 at which the movement direction changes in the cycle is the maximum angle. Hence, it is determined that the workpiece 21 interferes with the tool (not shown).

Figure 7:
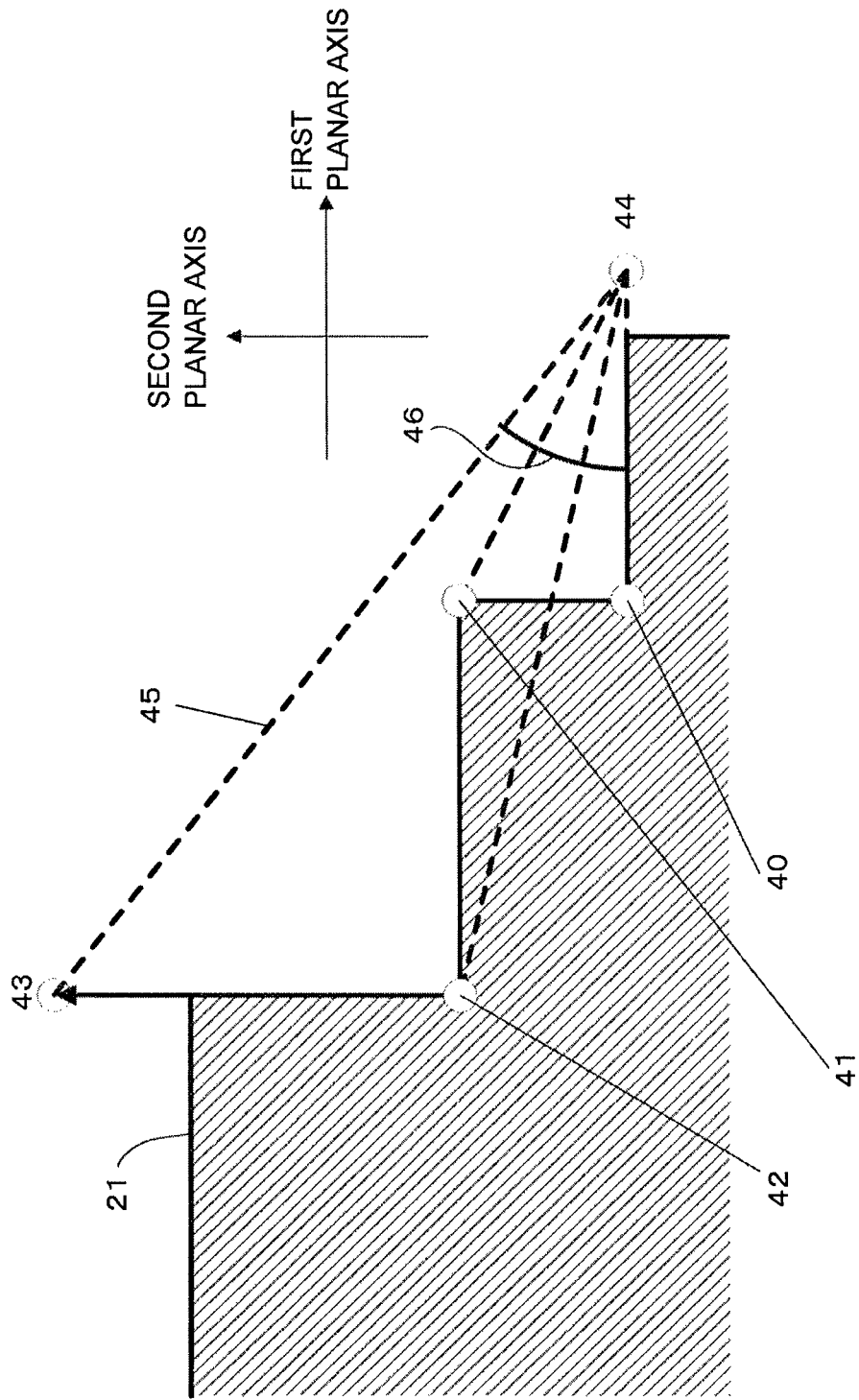
FIG. 7 is a diagram for explaining Example 2 of the second piece of interference check means.

FIG. 7 is a diagram for explaining Example 2 of the second piece of interference check means. When an angle 46 formed by the first planar axis and a straight line 45 connecting a cutting start position 44 in the next cycle to a cutting completion position 43 in the cycle is the maximum angle, it is determined that the movement path does not interfere with the workpiece 21.

Figure 8:
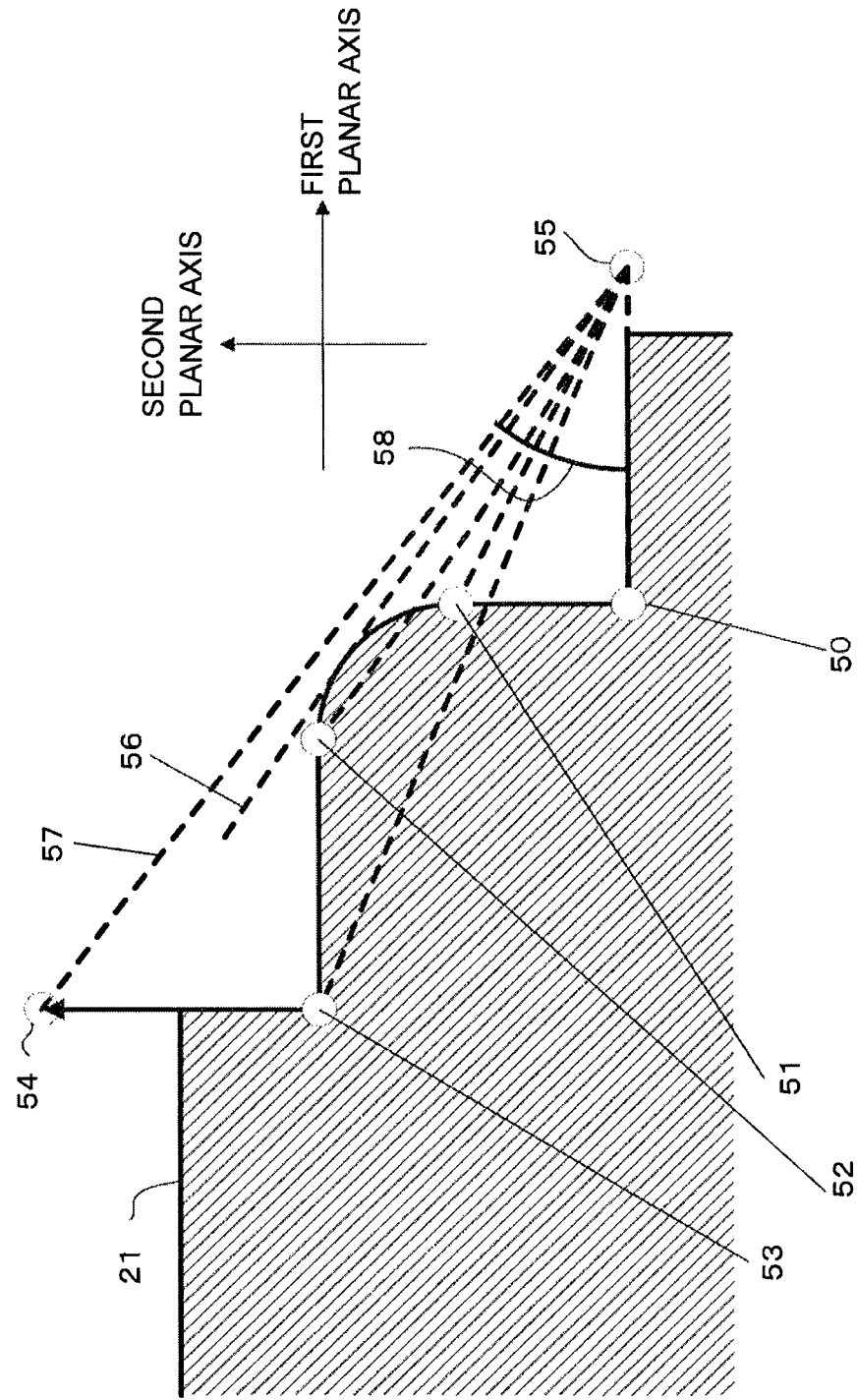
FIG. 8 is a diagram for explaining Example 3 of the second piece of interference check means.

FIG. 8 is a diagram for explaining Example 3 of the second piece of interference check means. When an angle 58 formed by the first planar axis and a straight line 57 connecting a cutting start position 55 in the next cycle to a cutting completion position 54 in the cycle is the maximum angle, it is determined that the movement path does not interfere with the workpiece 21. Namely, out of all the arcs in the cycle, the angle formed by the first planar axis and a tangential line 56, of an arc, which passes through the cutting start position 55 in the next cycle is smaller than the angle formed by the first planar axis and the straight line 57 connecting the cutting start position 55 in the next cycle to the cutting completion position 54 in the cycle. Hence, it is determined that the movement path does not interfere with the workpiece 21.

(Third Piece of Interference Check Means)

Figure 9:
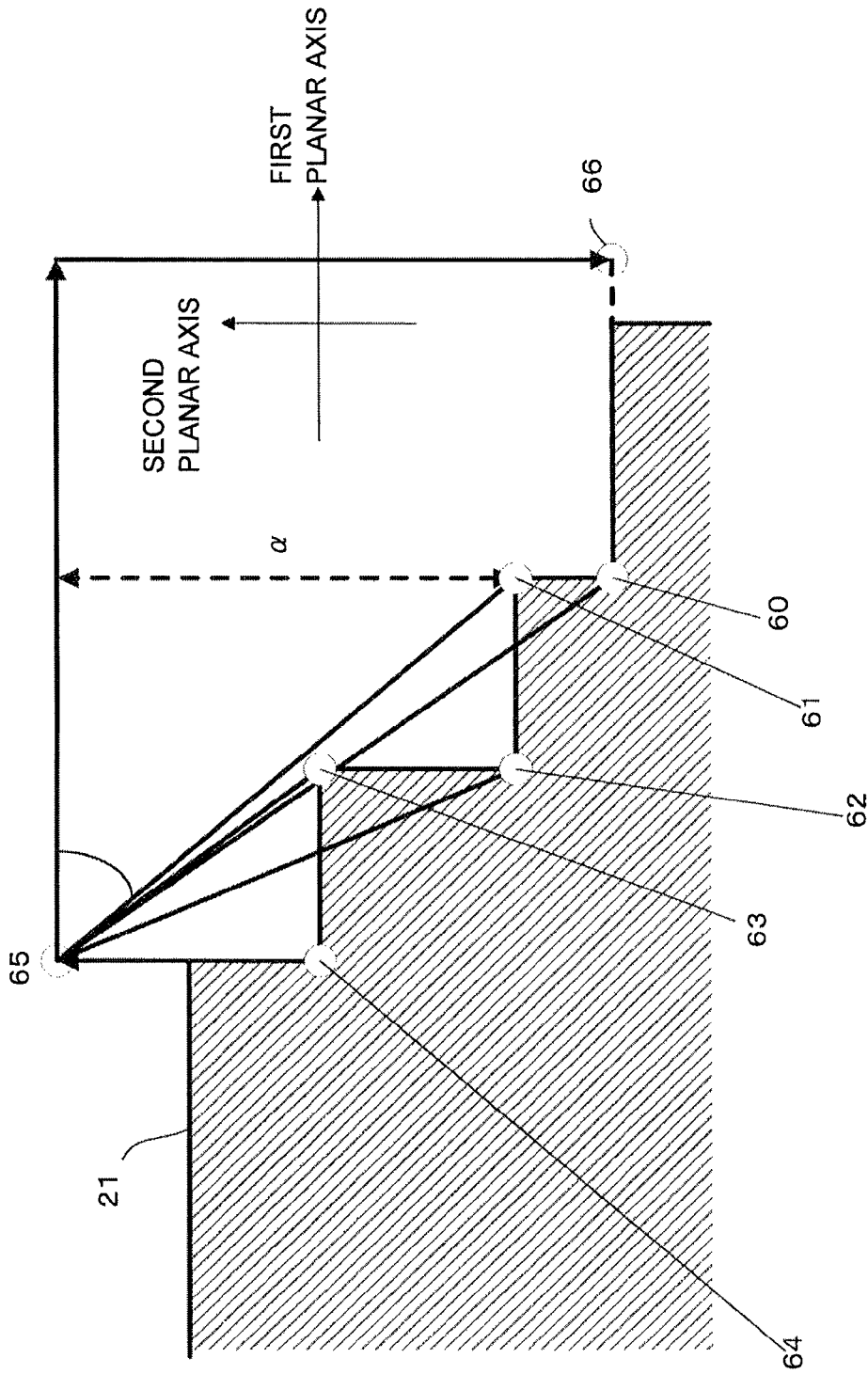
FIG. 9 is a diagram for explaining a path in the canned cycle in the conventional art and a reference value α.

In the case of a straight movement from a cutting completion position 65 in the cycle to a cutting start position 66 in the next cycle, a reference value α is discussed. The reference value α is a distance in, the direction of the second planar axis, or the second planar axis direction, from a position 61 at which the movement direction changes and for which an angle formed by the first planar axis and a straight line connecting the cutting completion position 65 in the cycle to a position at which the movement direction changes in the cycle is at its minimum to the workpiece 21 on the path of the conventional canned cycle, illustrated in FIGS. 9, constituted of a return once from the cutting completion position 65 in the cycle to the start position of the cycle or a movement along only the first planar axis followed by a movement to the cutting start position 66 in the next cycle. In other words, the reference value α is a distance from the position 61 where the movement direction changes in the cycle to a straight line which passes through the cutting completion position 65 in the cycle and is parallel to the first planar axis.

Figure 11:
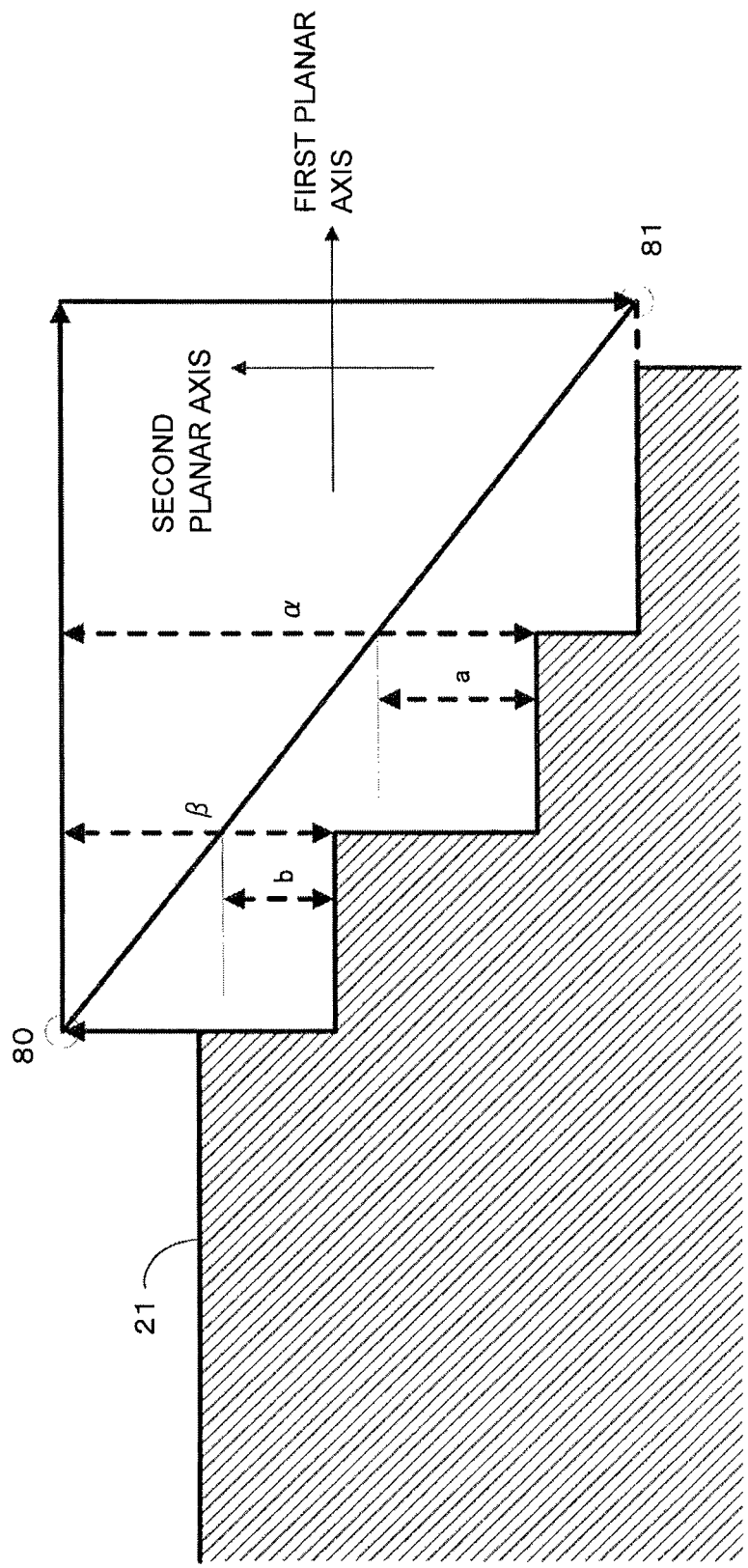
FIG. 11 is a diagram for explaining an example of a third piece of interference check means and a fourth piece of interference check means.

When a distance in the second planar axis direction, to a set path, from the position at which the movement direction changes and for which an angle formed by the first planar axis and a straight line connecting the cutting completion position 65 in the cycle to a position at which the movement direction changes in the cycle is at its minimum, that is, a distance designated by a in FIG. 11 is smaller than a value set according to an instruction or a parameter, it is determined that the path interferes with the workpiece 21.

(Fourth Piece of Interference Check Means)

Figure 10:
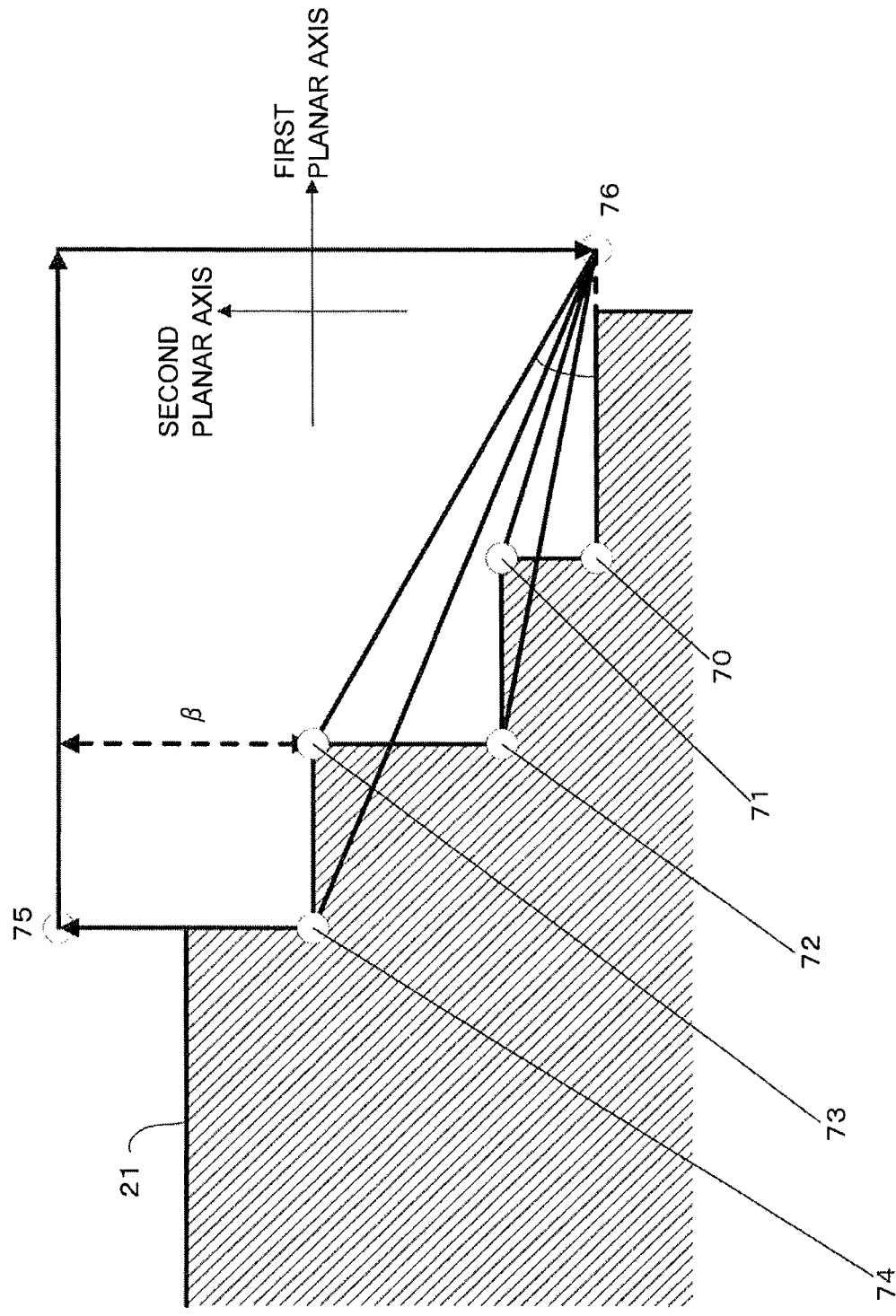
FIG. 10 is a diagram for explaining the path in the canned cycle in the conventional art and a reference value β.

In the case of a straight movement from a cutting completion position 75 in the cycle to a cutting start position 76 in the next cycle, a reference value β is discussed as the fourth piece. The reference value β is a distance in the second planar axis from a position 73 at which the movement direction changes and for which an angle formed by the first planar axis and a straight line connecting the cutting start position 76 in the next cycle to a position at which the movement direction changes in the cycle is at its maximum to the workpiece 21 on the path of the conventional canned cycle, illustrated in FIG. 10, constituted of a return once from the cutting completion position 75 in the cycle to the start position of the cycle or a movement along only the first planar axis followed by a movement to the cutting start position 76 in the next cycle. In other words, the reference value β is a distance from the position 73 at which the movement direction changes in the cycle to a straight line which passes through the cutting completion position 75 in the cycle and is parallel to the first planar axis.

When a distance in the second planar axis direction, to a set path, from the position 73 at which the movement direction changes and for which an angle formed by the first planar axis and a straight line connecting the cutting start position 76 in the next cycle to a position at which the movement direction changes in the cycle is at its maximum, that is, a distance designated by b in FIG. 11 is smaller than a value set according to an instruction or a parameter, it is determined that the path interferes with the workpiece 21.

In the case where interference between the path and the workpiece is checked by the third piece of interference check means and the fourth piece of interference check means, for the reference values α and β in FIG. 11, when the distance a or the distance b in the second planar axis direction from the workpiece 21 to the path is smaller than a value set according to an instruction or a parameter, it is determined that the path interferes with the workpiece 21.

Interference with the workpiece is prevented using one of the first to fourth pieces of interference check means or a combination of these. When no interference with the workpiece is determined by all of the first to fourth pieces of interference check means, cycle operation along a path of a straight movement from the cutting completion position in the cycle to the cutting start position in the next cycle mentioned above is made as illustrated in FIGS. 16 to 20.

A reduced path for each cycle in a simple canned cycle has a high possibility to be the path in Embodiment 1 illustrated in FIG. 3. In a canned cycle with roughness in its one cycle, when finishing is performed for a finishing shape in the order from the last cycle, there is a possibility that the workpiece is on the straight path from the cutting completion position in the cycle to the next cutting start position. In this stage, a path of a movement along two blocks of straight lines, from the cutting completion position in the cycle to the cutting start position in the next cycle, which are shortest within a range in which no prevention of interference with the workpiece is determined, is set.

As illustrated in FIG. 4, when it is determined that the path interferes with the workpiece by the first piece of interference check means, there is a possibility that a movement, in the second planar axis from the cutting completion position in the cycle immediately results in interference of the path with the workpiece.

Therefore, as illustrated in FIG. 16, FIG. 17, FIG. 18, FIG. 12 and FIG. 13, the path is set such that, regarding a position shifted parallel to the first planar axis direction from the cutting completion position in the cycle, the path is determined not to interfere with the workpiece by the first to fourth pieces of interference check means. Thereby, the path is reduced to reduce cycle time.

Figure 12:
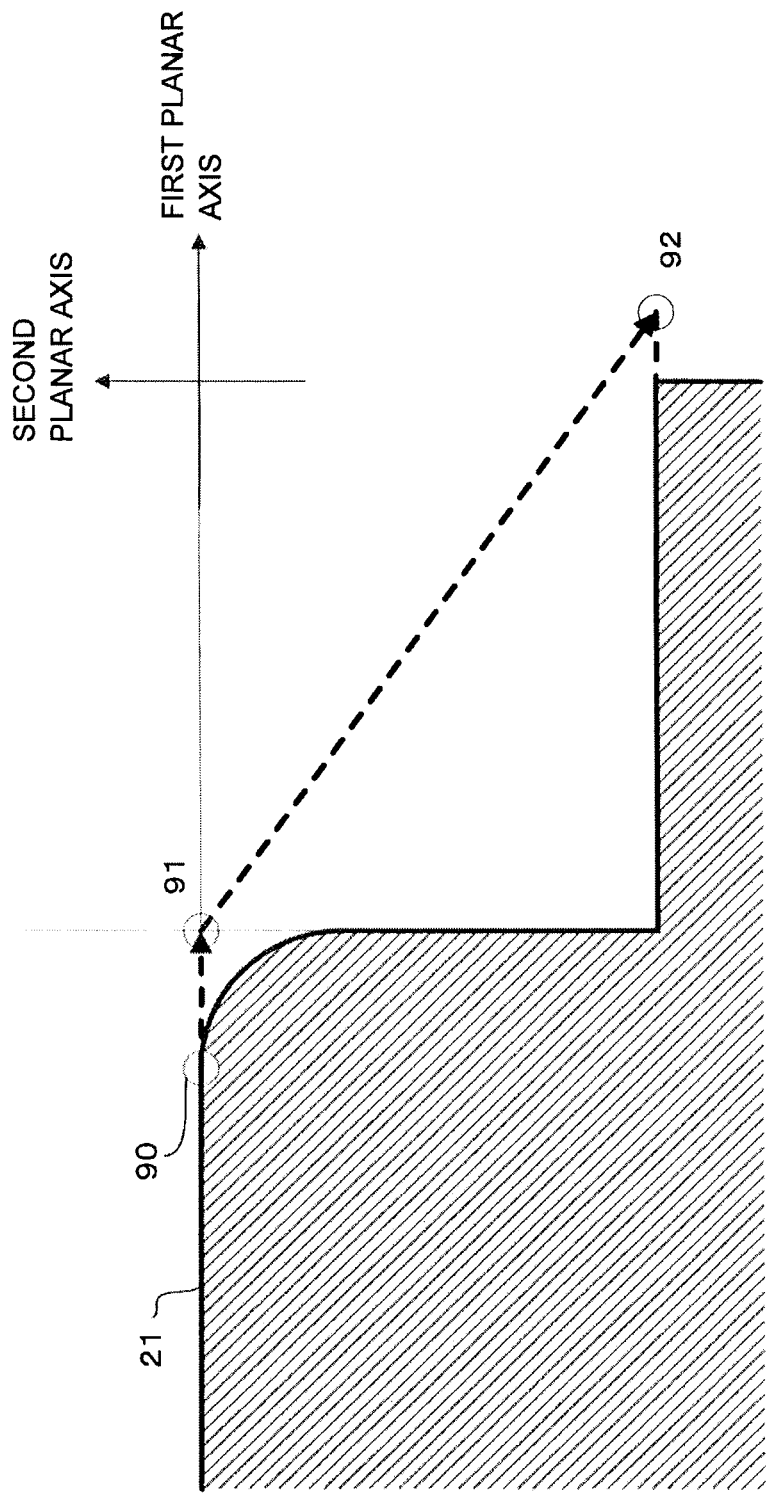
FIG. 12 is a diagram for explaining Movement Path 1 in a canned cycle according to Embodiment 2 of the present invention.

FIG. 12 is a diagram for explaining Movement Path 1 in a canned cycle according to Embodiment 2. At the time point of a parallel movement in, the direction of the first planar axis, or, the first planar axis direction, from a cutting completion position 90 in the cycle to a position 91 where it is determined that the path does not interfere with the workpiece 21 by the first piece of interference check means, when it is determined that the path does not interfere with the workpiece 21 by the second to fourth pieces of interference check means, a path of a straight movement from the position to a cutting start position 92 in the next cycle is set.

Figure 13:
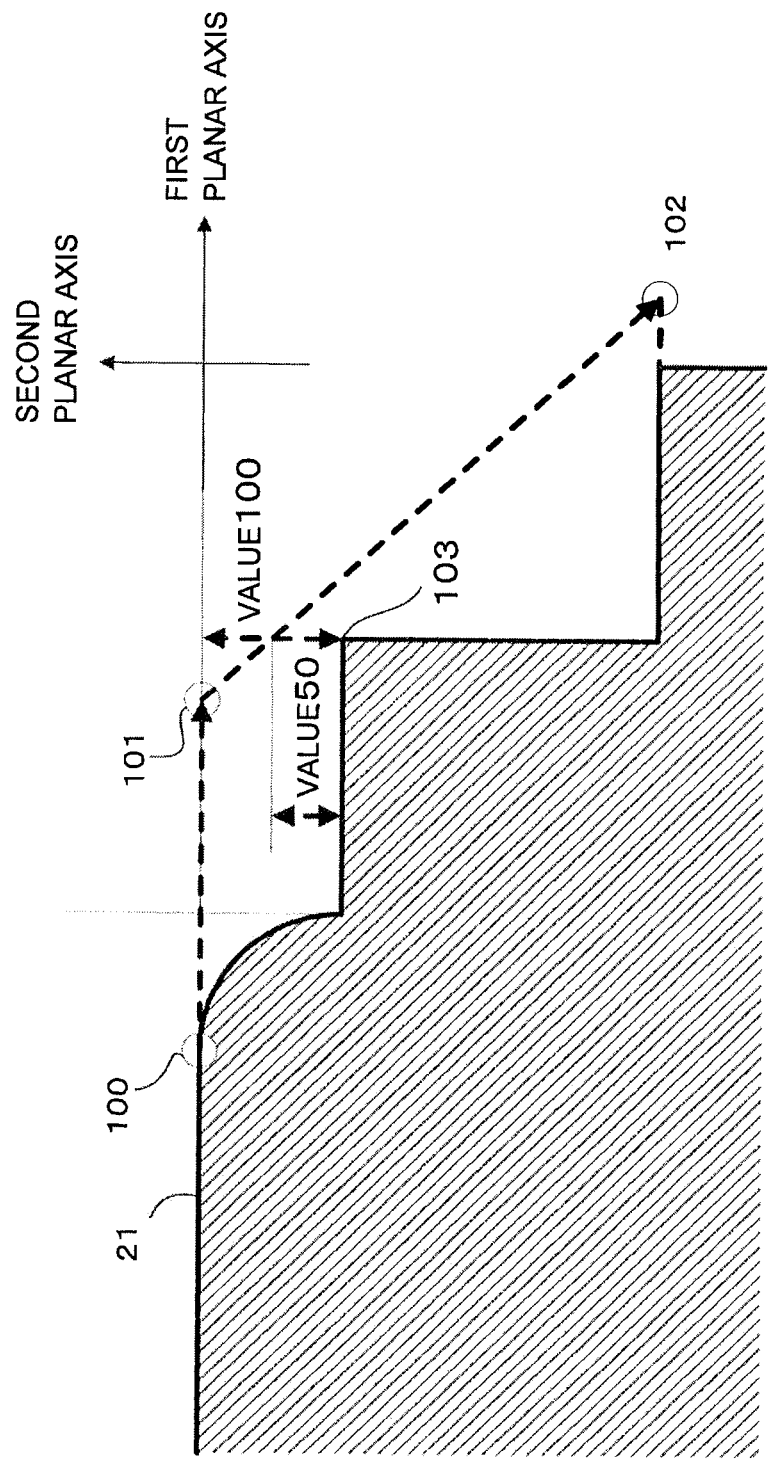
FIG. 13 is a diagram for explaining Movement Path 2 in the canned cycle according to Embodiment 2 of the present invention.

FIG. 13 is a diagram for explaining Movement Path 2 in the canned cycle according to Embodiment 2. For example, it is supposed that the value set according to an instruction or a parameter is set to be 50 when the reference value is 100. At the time point of a parallel movement in the first planar axis direction from the cutting completion position in the cycle to a position where it is determined by the first piece of interference check means that the path does not interfere with the workpiece, it is determined by the second to fourth pieces of interference check means that the path interferes with the workpiece.

Herein, the position at which the movement direction changes and for which an angle formed by the first planar axis and a straight line connecting the cutting completion position 100 in the cycle to a position at which the movement direction changes in, the cycle is at its minimum is same as the position at which the movement direction changes and for which an angle formed by the first planar axis and a straight line connecting the cutting start position 102 in the next cycle to a position at which the movement direction changes in the cycle is at its maximum, that is, a position 103 illustrated in FIG. 13. In this stage, the value set according to an instruction or a parameter is 50. Hence, a position shifted parallel to the first planar axis from the cutting completion position 100 in the cycle further undergoes a parallel movement, such that a straight line which passes through the cutting start position in the next cycle and the position apart from the workpiece by 50 in the second planar axis direction from the position 103 is a movement path. Thereby, a position 101 is identified which falls within a range in which no interference with the workpiece is determined.

Figure 14:
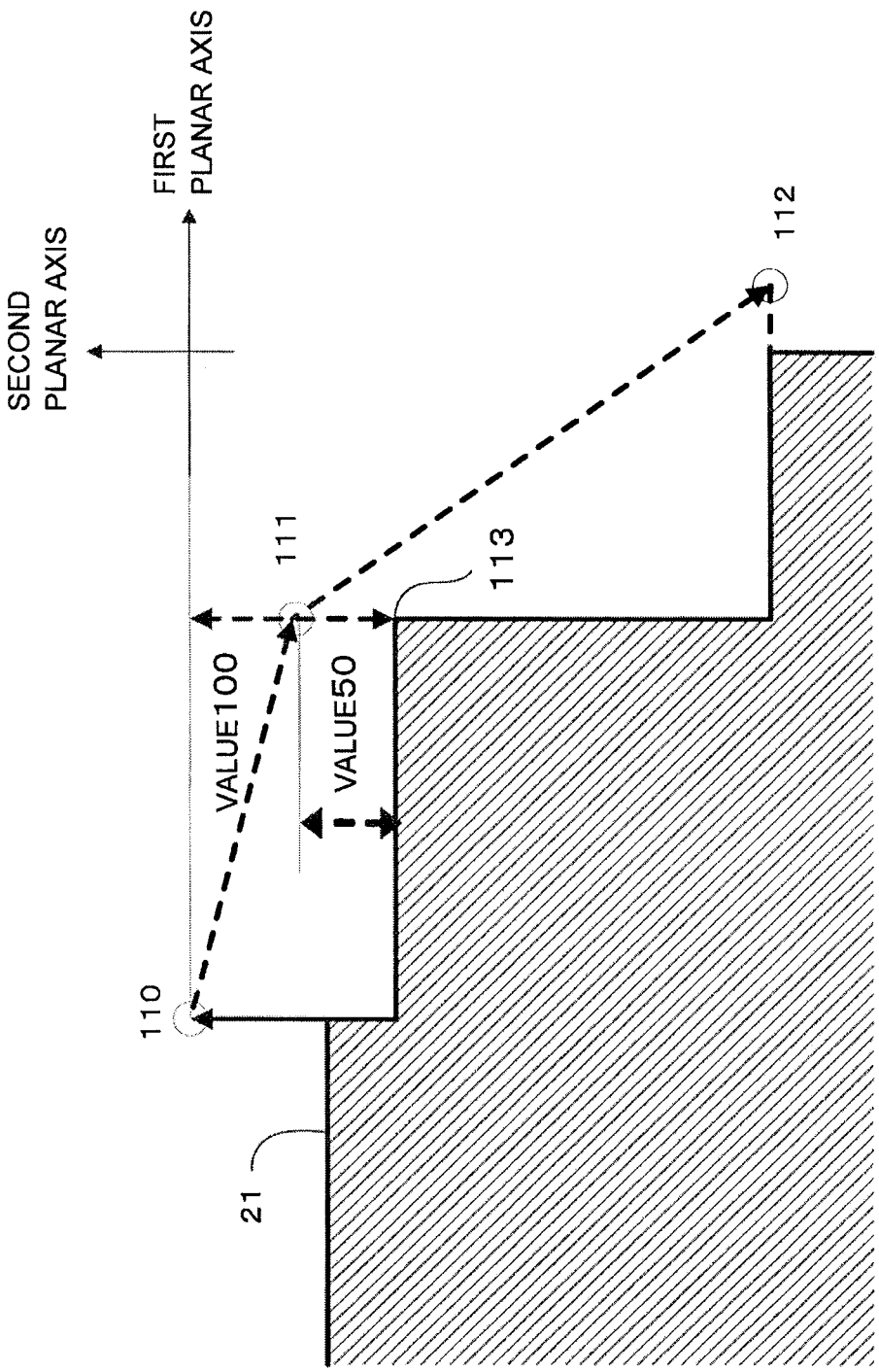
FIG. 14 is a diagram for explaining Movement Path 3 in the canned cycle according to Embodiment 2 of the present invention.

FIG. 14 is a diagram for explaining Movement Path 3 in the canned cycle according to Embodiment 2. For example, it is supposed that the value set according to an instruction or a parameter is set to be 50 when the reference value is 100. Herein, the position at which the movement direction changes and for which an angle formed by the first planar axis and a straight line connecting the cutting completion position 110 in the cycle to a position at which the movement direction changes in the cycle is at its minimum is same as the position at which the movement direction changes and for which an angle formed by the first planar axis and a straight line connecting the cutting start position 112 in the next cycle to a position at which the movement direction changes in the cycle is at its maximum, that is, a position 113 illustrated in FIG. 14. In this stage, the value set according to an instruction or a parameter is 50. Hence, a path constituted of two straight Lines passing through the position apart from the workpiece by 50 in the second planar axis from the position 113 is set.

As illustrated in FIG. 16, FIG. 17, FIG. 18, FIG. 19, FIG. 20 and FIG. 14, the path is set such that it is determined that the path does not interfere with the workpiece 21 by the third and fourth pieces of interference check means when it is determined that the path does not interfere with the workpiece 21 by the first piece of interference check means and it is determined that the path interferes with the workpiece by the second to fourth pieces of interference check means. As a result, the two blocks of straight lines set as the path have 90 degrees or more and less than 180 degrees which is an angle formed by the two straight lines.

Figure 15:
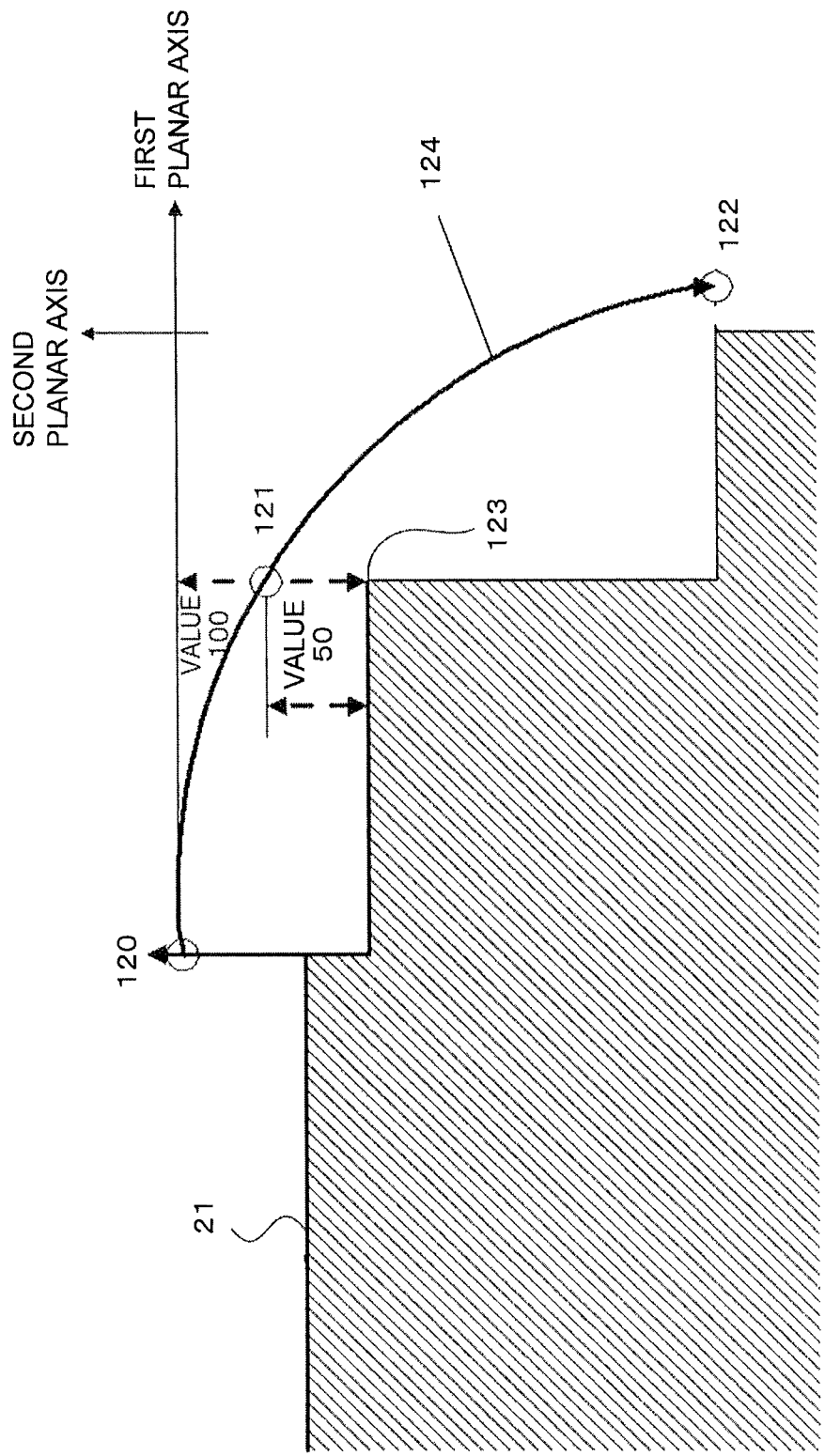
FIG. 15 is a diagram for explaining a movement path in a canned cycle according to Embodiment 3 of the present invention.

Embodiment 3 substitutes an arc movement for the blocks of the straight movements in Embodiment 2. Otherwise, an arc movement allows the two blocks of straight movements to be one block of arc movement. When the path of the two blocks of straight movements exemplarily illustrated in FIG. 14 is changed to that of one block of arc movement, it is a movement path as illustrated in FIG. 15. This can attain smooth operation compared with the path of the straight movements constituted of two blocks in Embodiment 2.

Moreover, depending on the shape of the workpiece 21, an arc movement between the cutting completion position 120 in the cycle and a position, which falls within a range in which no interference with the workpiece is determined and a straight movement between a position 121 which falls within the succeeding range in which no interference with the workpiece is determined and a cutting start position 122 in the next cycle may be made. Conversely, a straight movement between the cutting completion position 120 in the cycle and the position 121 which falls within the range in which no interference with the workpiece is determined and an arc movement between the position 121 which falls within the succeeding range in which no interference with the workpiece is determined and the cutting start position 122 in the next cycle may be made.

Figure 16:
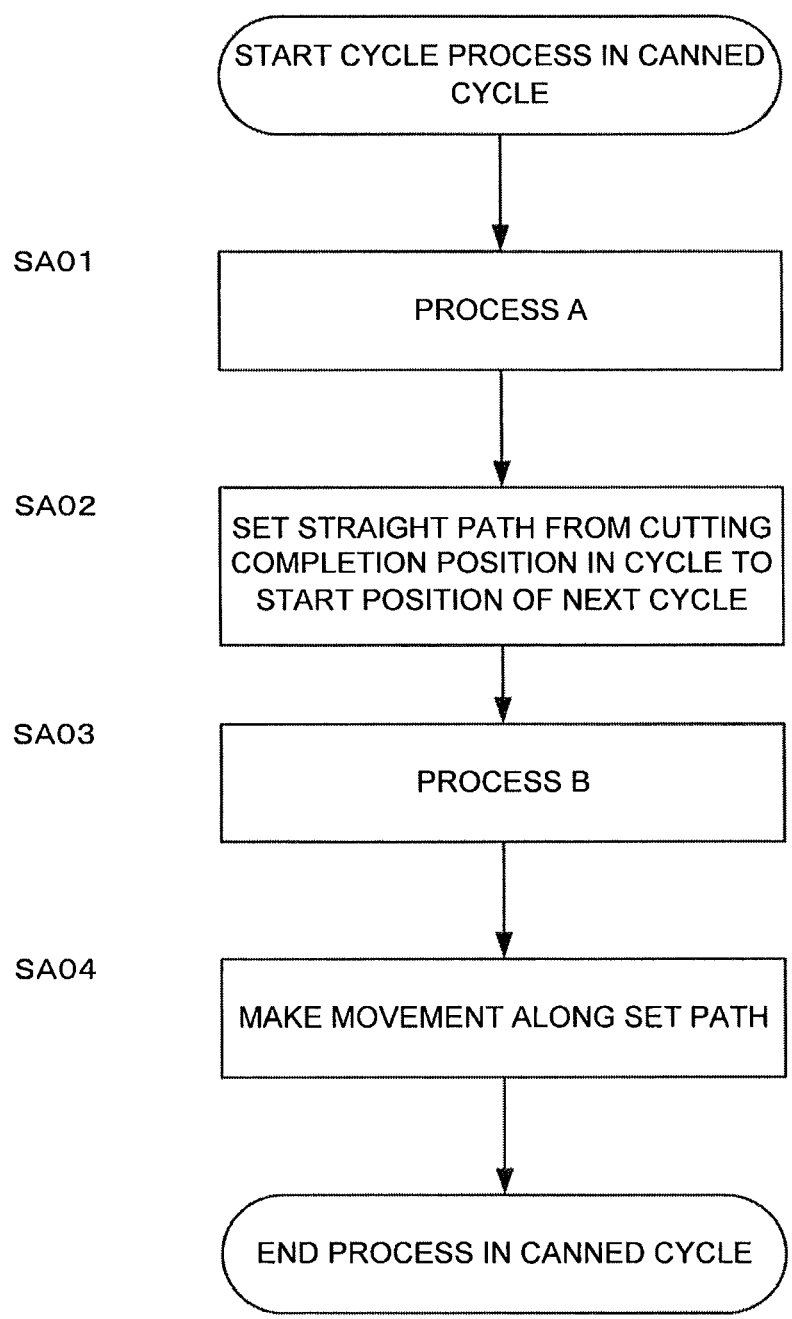
FIG. 16 is a diagram for explaining a cycle process in the canned cycle.
Figure 17:
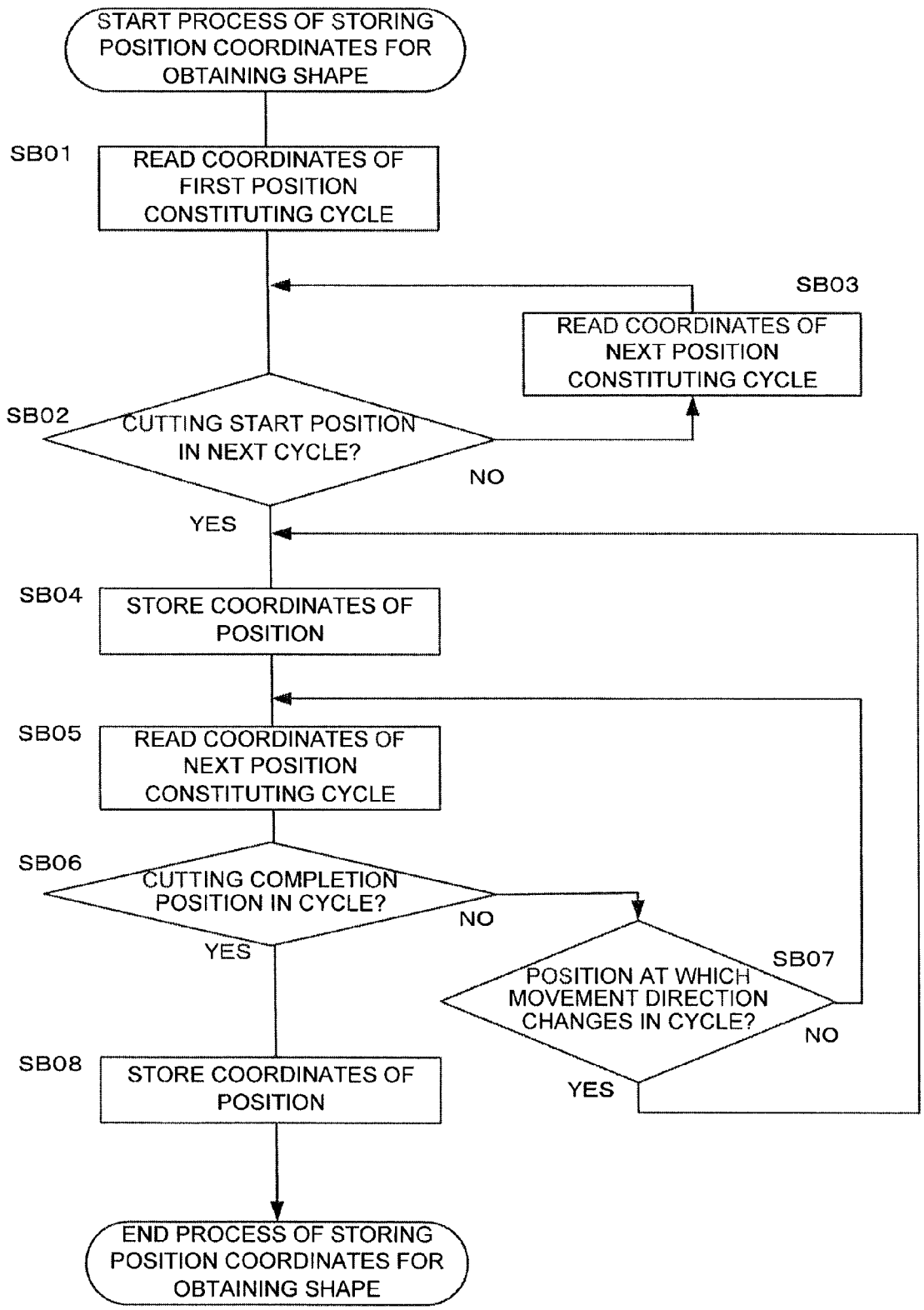
FIG. 17 is a flowchart for explaining a process A in FIG. 16.
Figure 18:
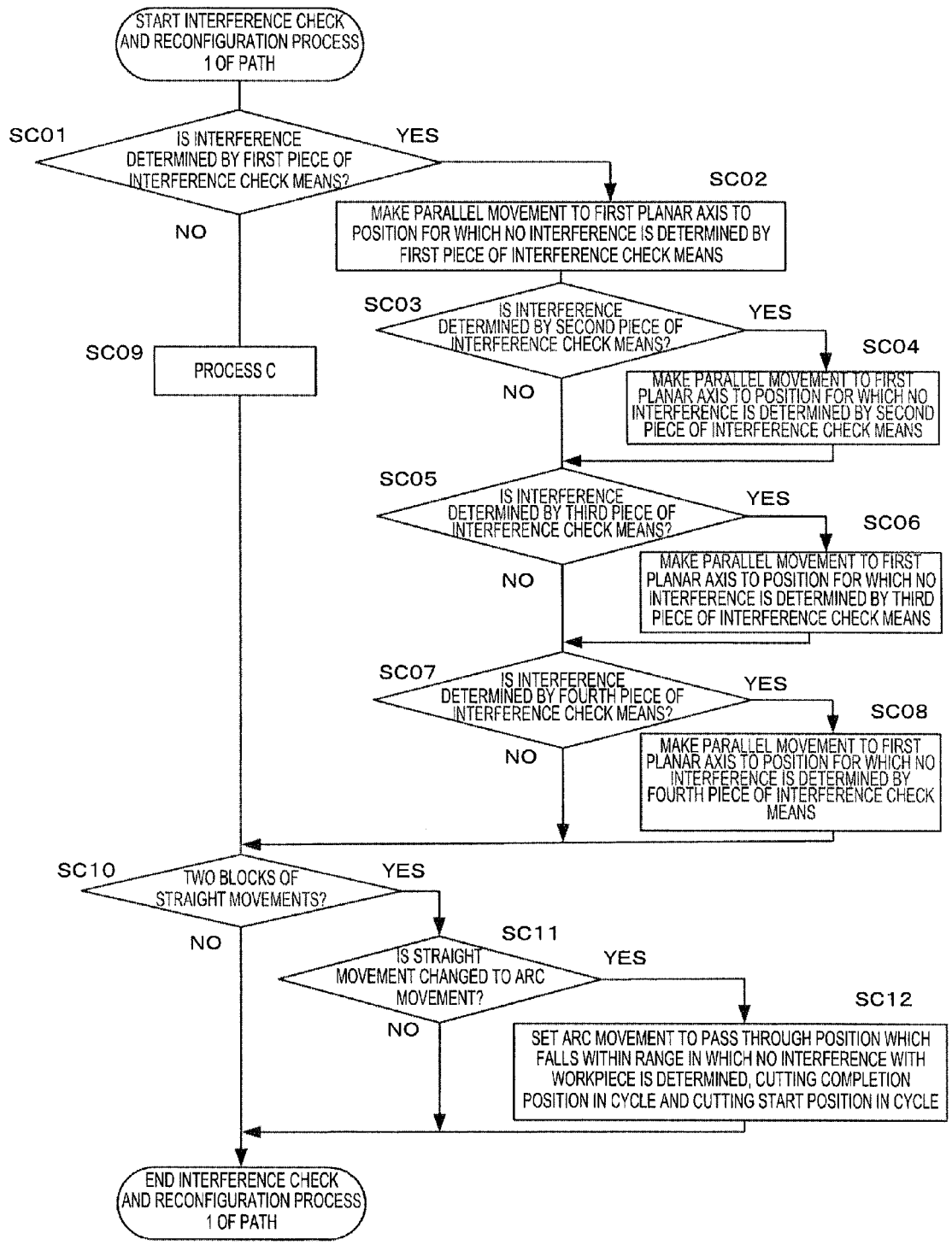
FIG. 18 is a flowchart for explaining a process B in FIG. 16.
Figure 19:
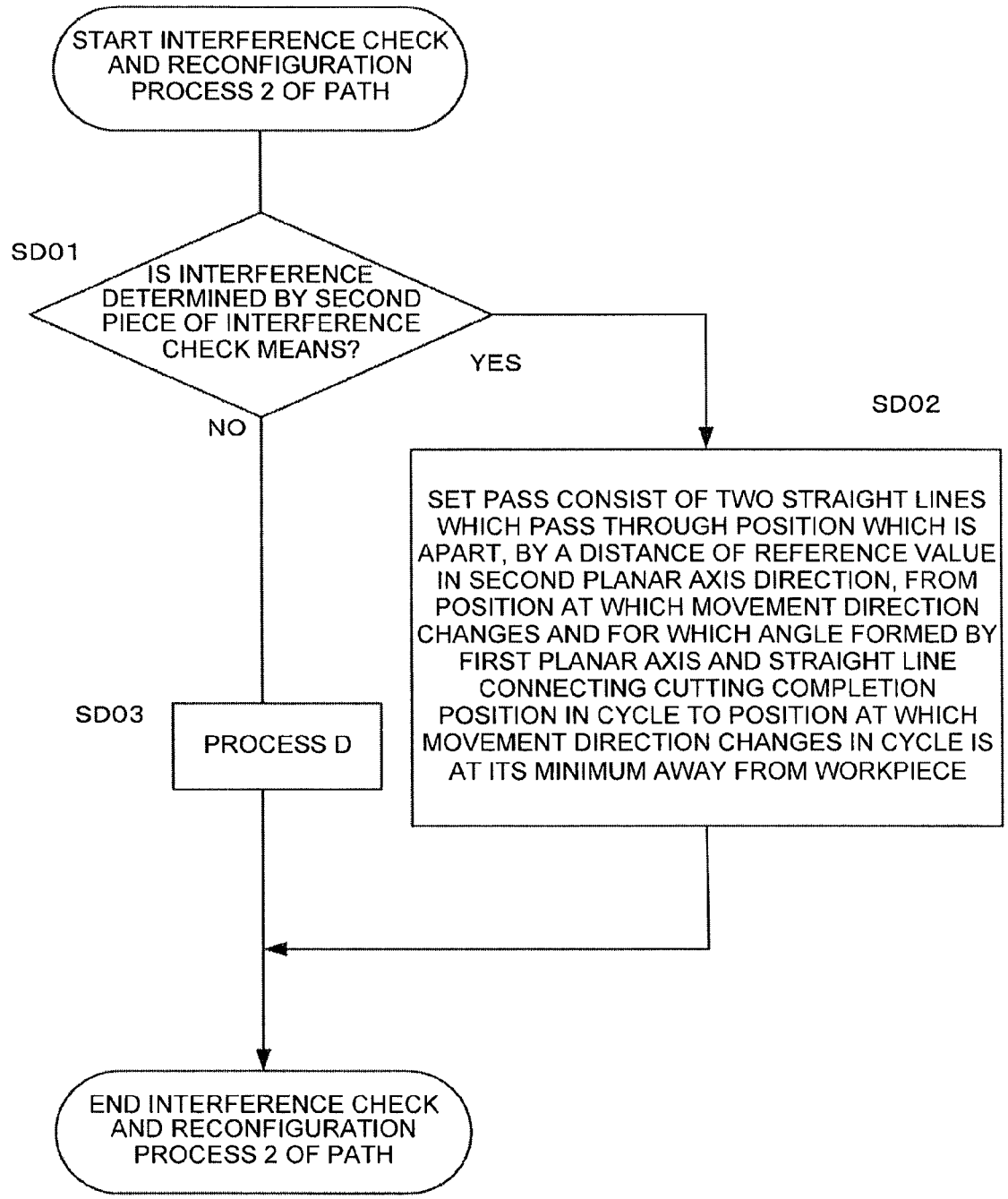
FIG. 19 is a flowchart for explaining a process C in FIG. 18.
Figure 20:
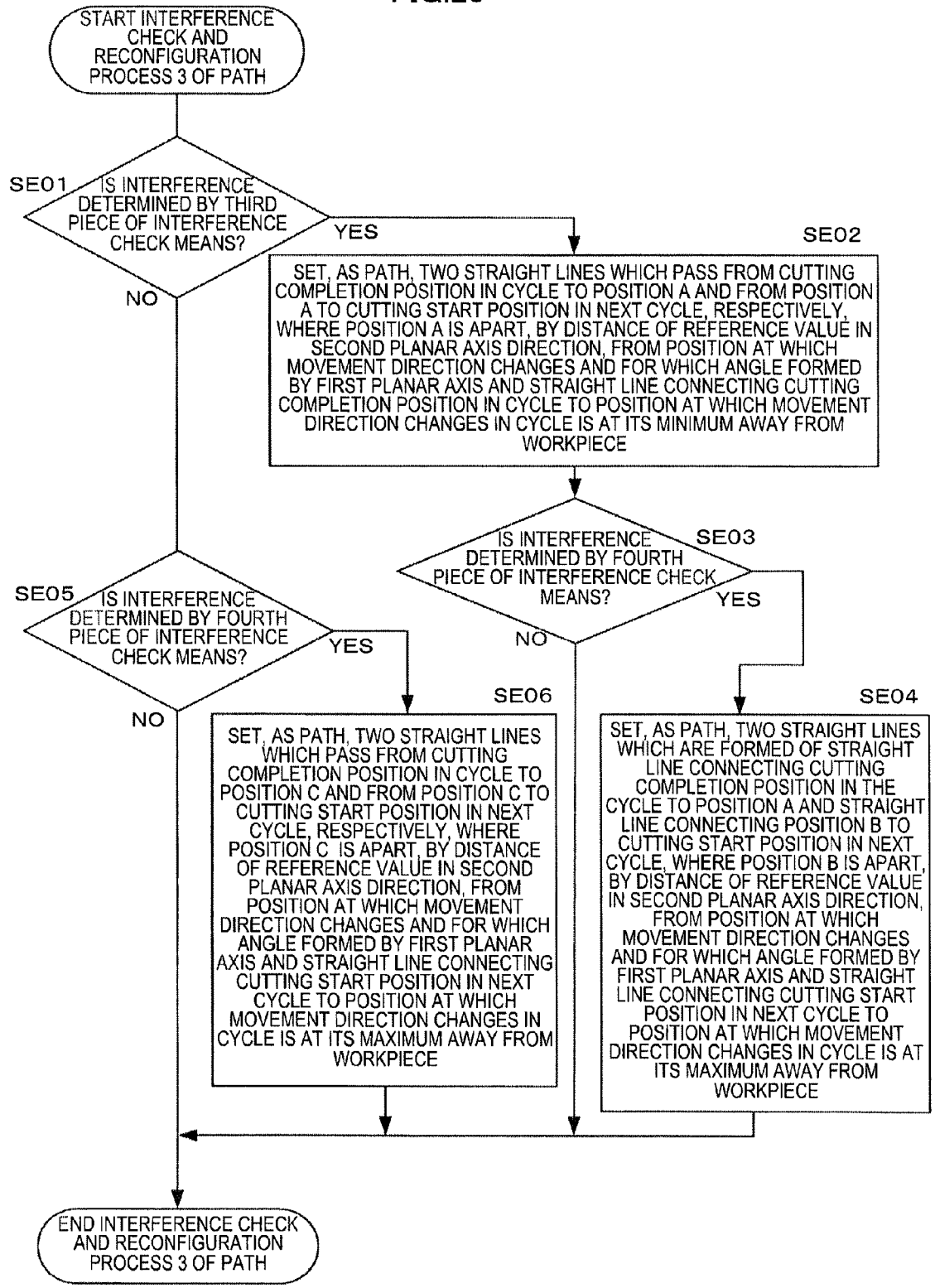
FIG. 20 is a flowchart for explaining a process D in FIG. 19.

Next, a cycle process in the canned cycle is described using flowcharts. FIG. 16 is a diagram for explaining a cycle process in the canned cycle. FIG. 17 is a flowchart for explaining a process A in FIG. 16. FIG. 18 is a flowchart; for explaining a process B in FIG. 16. FIG. 19 is a flowchart for explaining a process C in FIG. 18. FIG. 20 is a flowchart for explaining a process D in FIG. 19.

FIG. 16 is a flowchart of a cycle process in the canned cycle. It is described according to the following steps.

[Step SA01] A process A is performed. Details of the process A are a process in the flowchart illustrated in FIG. 17.

[Step SA02] A straight path from the cutting completion position in the cycle to the start position of the next cycle is set.

[Step SA03] A process B is performed. Details of the process B are a process in the flowchart illustrated in FIG. 18.

[Step SA04] A movement along the set path is made to end the current cycle in the canned cycle.

FIG. 17 is a flowchart of a process of storing position coordinates for obtaining the shape. It is described according to the following steps.

[Step SB01] Coordinates of the first position constituting the cycle are read.

[Step SB02] Whether or not it is the cutting start position in the next cycle is determined. When it is the cutting start position in the next cycle (YES), the process is put forward to step SB04, and when it is not the cutting start position in the next cycle (NO), the process is put forward to step SB03.

[Step SB03] Coordinates of the next position constituting the cycle are read. The process is returned to step SB02.

[Step SB04] The coordinates of the position are stored.

[Step SB05] Coordinates of the next position constituting the cycle are read.

[Step SB06] Whether or not it is the cutting completion position in the cycle is determined. When it is the cutting completion position in the cycle (YES), the process is put forward to step SB08, and when it is not the cutting completion position in the cycle (NO), the process is put forward to step SB07.

[Step SB07] Whether or not it is a position at which the movement direction changes in the cycle is determined. When it is a position at which the movement direction changes (YES), the process is returned to step SB04, and when it is a position at which the movement direction does not change (NO), the process is returned to step SB05.

[Step SB08] The coordinates of the position are stored to end the process of storing the position coordinates for obtaining the shape.

FIG. 18 is a flowchart of the interference check and a reconfiguration process 1 of the path. It is described according to the following steps.

[Step SC01] Whether or not interference is determined by the first piece of interference check means is determined. When interference is determined by the first piece of interference check means (YES), the process is put forward to step SC02, and when no interference is determined by the first piece of interference check means (NO), the process is put forward to step SC09.

[Step SC02] A parallel movement to the first planar axis is made to a position for which no interference is determined by the first piece of interference check means.

[Step SC03] Whether or not interference is determined by the second piece of interference check means is determined. When interference is determined by the second piece of interference check means (YES), the process is put forward to step SC04, and when no interference is determined by the second piece of interference check means (NO), the process is put forward to step SC05.

[Step SC04] A parallel movement to the first planar axis is made to a position for which no interference is determined by the second piece of interference check means.

[Step SC05] Whether or not interference is determined by the third piece of interference check means is determined. When interference is determined by the third piece of interference check means (YES), the process is put forward to step SC06, and when no interference is determined by the third piece of interference check means (NO), the process is put forward to step SC07.

[Step SC06] A parallel movement to the first planar axis is made to a position for which no interference is determined by the third piece of interference check means.

[Step SC07] Whether or not interference is determined by the fourth piece of interference check means is determined. When interference is determined by the fourth piece of interference check means (YES), the process is put forward to step SC08, and when no interference is determined by the fourth piece of interference check means (NO), the process is put forward to step SC10.

[Step SC08] A parallel movement to the first planar axis is made to a position for which no interference is determined by the fourth piece of interference check means. The process is put forward to step SC10.

[Step SC09] A process C is performed. Details of the process C are a flowchart illustrated in FIG. 19.

[Step SC10] Two blocks of straight movements or not is determined. In the case of two blocks of straight movements (YES), the process is put forward to step SC11, and in the case of no two blocks of straight movements (NO), the interference check and the reconfiguration process 1 of the path are ended.

[Step SC11] Whether or not the straight movements are changed to an arc movement is determined. In the case of change to an arc movement (YES), the process is put forward to step SC12, and in the case of no change to an arc movement (NO), the interference check and the reconfiguration process 1 of the path are ended.

[Step SC12] The arc movement is set to pass through a position which falls within a range in which no interference with the workpiece is determined, the cutting completion position in the cycle and the cutting start position in the cycle to end the interference check and the reconfiguration process 1 of the path.

FIG. 19 is a flowchart of the interference check and a reconfiguration process 2 of the path. It is described according to the following steps.

[Step SD01] Whether or not interference is determined by the second piece of interference check means is determined. When interference is determined by the second piece of interference check means (YES), the process is put forward to step SD02, and when no interference is determined by the second piece of interference check means (NO), the process is put forward to step SD03.

[Step SD02] A path, of two straight lines, which passes through a position which is led by parting a position at which the movement direction changes and for which an angle formed by the first planar axis and a straight line connecting the cutting completion position in the cycle to a position at which the movement direction changes in the cycle is at its minimum away from the workpiece by the distance of the reference value in the second planar axis is set to end the interference check and the reconfiguration process 2 of the path.

[Step SD03] A process D is performed and the interference check and the reconfiguration process 2 of the path are ended. Details of the process D are a process in the flowchart illustrated in FIG. 20.

FIG. 20 is a flowchart of the interference check and a reconfiguration process 3 of the path. It is described according to the following steps.

[Step SE01] Whether or not interference is determined by the third piece of interference check means is determined. When interference is determined by the third piece of interference check means, the process is put forward to step SE02, and when no interference is determined by the third piece of interference check means, the process is put forward to step SE05.

[Step SE02] Two straight lines which pass from the cutting completion position in the cycle to a position a and from the position a to the cutting start position in the next cycle, respectively, are set as the path, the position a being set as a position which is led by parting a position at which the movement direction changes and for which an angle formed by the first planar axis and a straight line connecting the cutting completion position in the cycle to a position at which the movement direction changes in the cycle is at its minimum away from the workpiece by the distance of the reference value in the second planar axis direction.

[Step SE03] Whether or not interference is determined by the fourth piece of interference check means is determined. When interference is determined by the fourth piece of interference check means (YES), the process is put forward to step SE04.

[Step SEO4] Two straight lines which are formed of a straight line connecting the cutting completion position in the cycle to a position a and ashraight line connecting a position b to the cutting start position in the next cycle are set as the path, the position b being set as a position which is led by parting a position at which the movement direction changes and for which an angle formed by the first planar axis and a straight line connecting the cutting start position in the next cycle to a position at which the movement direction changes in the cycle is at its maximum away from the workpiece by the distance of the reference value in the second planar axis direction. The interference check and the reconfiguration process 3 of the path are ended.

[Step SE05] Whether or not interference is determined by the fourth piece of interference check means is determined. When interference is determined by the fourth piece of interference check means (YES), the process is put forward to step SE06, and when no interference is determined by the fourth piece of interference check means (NO), the interference check and the reconfiguration process 3 of the path are ended.

[Step SE06] Two straight lines which pass from the cutting completion position in the cycle to a position c and from the position c to the cutting start position in the next cycle, respectively, are set as the path, the position c being set as a position which is led by parting a position at which the movement direction changes and for which an angle formed by the first planar axis and a straight line connecting the cutting start position in the next cycle to a position at which the movement direction changes in the cycle is at its maximum away from the workpiece by the distance of the reference value in the second planar axis direction. The interference check and the reconfiguration process 3 of the path are ended.

The invention claimed is:

1. A numerical control apparatus configured to control a lathe where a workpiece rotates in order to reduce a path length, the lathe upon one instruction, configured to machine a workpiece from a material shape thereof to a finishing shape thereof in accordance with a canned cycle constituted of a plurality of cutting cycles for each cutting cycle of which a movement path from a start position thereof to an end position thereof is formed of a plurality of paths as one cutting cycle, the apparatus comprising:

an interference check configured to:

determine whether or not interference between the workpiece and the movement path arises when the movement path from a cutting completion position in the one cycle to a cutting start position in a next cycle is straight, change, when the interference is determined not to arise, the movement path from the cutting completion position in the one cycle to the cutting start position in the next cycle to be straight, and when interference is determined to arise, change the movement path from the cutting completion position in the one cycle to the cutting start position in the next cycle so that interference is eliminated, wherein when the interference check determines that the movement path interferes with the workpiece, a straight movement along two blocks of straight lines from the cutting completion position in the one cycle to the cutting start position in the next cycle is made within a range in which no interference with the workpiece is determined, the two straight lines forming an angle of 90 degrees or more and less than 180 degrees.

2. A numerical control apparatus configured to control a lathe where a workpiece rotates in order to reduce a path length, the lathe upon one instruction, configured to machine a workpiece from a material shape thereof to a finishing shape thereof in accordance with a canned cycle constituted of a plurality of cutting cycles for each cutting cycle of which a movement path from a start position thereof to an end position thereof is formed of a plurality of paths as one cutting cycle, the apparatus comprising:

an interference check configured to:

determine whether or not interference between the workpiece and the movement path arises when the movement path from a cutting completion position in the one cycle to a cutting start position in a next cycle is straight, change, when the interference is determined not to arise, the movement path from the cutting completion position in the one cycle to the cutting start position in the next cycle to be straight, and when interference is determined to arise, change the movement path from the cutting completion position in the one cycle to the cutting start position in the next cycle so that interference is eliminated, wherein when the interference check determines that the movement path interferes with the workpiece, a movement with a shape of an arc is made, the arc passing through three positions of a position which falls within a range in which no interference with the workpiece is determined, the cutting completion position in the one cycle and the cutting start position in the next cycle.

* * * * *